March 15, 1960 M. E. EVANS 2,928,314

MOTION PICTURE PRINTER

Filed April 8, 1957 15 Sheets-Sheet 1

INVENTOR.

Martin E. Evans

BY

March 15, 1960 M. E. EVANS 2,928,314

MOTION PICTURE PRINTER

Filed April 8, 1957 15 Sheets-Sheet 2

INVENTOR.

Martin E. Evans

BY

March 15, 1960 M. E. EVANS 2,928,314

MOTION PICTURE PRINTER

Filed April 8, 1957

15 Sheets-Sheet 3

INVENTOR.

Martin E. Evans

March 15, 1960 M. E. EVANS 2,928,314

MOTION PICTURE PRINTER

Filed April 8, 1957 15 Sheets-Sheet 4

INVENTOR.

Martin E. Evans

March 15, 1960 M. E. EVANS 2,928,314

MOTION PICTURE PRINTER

Filed April 8, 1957 15 Sheets-Sheet 5

INVENTOR

Martin E. Evans

March 15, 1960 M. E. EVANS 2,928,314

MOTION PICTURE PRINTER

Filed April 8, 1957 15 Sheets-Sheet 6

INVENTOR.

Martin E. Evans

March 15, 1960 M. E. EVANS 2,928,314

MOTION PICTURE PRINTER

Filed April 8, 1957 15 Sheets-Sheet 7

INVENTOR.

Martin E. Evans

March 15, 1960 M. E. EVANS 2,928,314

MOTION PICTURE PRINTER

Filed April 8, 1957 15 Sheets-Sheet 8

INVENTOR.

BY Martin E. Evans

INVENTOR.
Martin E. Evans

INVENTOR.
Martin E. Evans

INVENTOR.
Martin E. Evans

March 15, 1960 M. E. EVANS 2,928,314

MOTION PICTURE PRINTER

Filed April 8, 1957 15 Sheets-Sheet 12

INVENTOR.

Martin E. Evans

INVENTOR.
Martin E. Evans

March 15, 1960 M. E. EVANS 2,928,314

MOTION PICTURE PRINTER

Filed April 8, 1957 15 Sheets-Sheet 14

INVENTOR.
Martin E. Evans

INVENTOR.
Martin E. Evans

United States Patent Office 2,928,314
Patented Mar. 15, 1960

2,928,314
MOTION PICTURE PRINTER

Martin E. Evans, Brooklyn, N.Y.

Application April 8, 1957, Serial No. 651,510
5 Claims. (Cl. 88—16.2)

This invention relates to multipurpose photographic apparatus and more particularly to a central organization of parts and associated agencies, primarily a motion picture camera and adaptive agencies for projecting, printing and sound recording. It is a continuation in part of application Serial No. 188,903 now matured as Patent No. 2,788,388.

It is an object of this invention to provide a motion picture camera with unitary structures which lend themselves to multipurpose use. For example, a mechanism is required for moving the film intermittently in exposing film in a camera, in projecting from the film, and by choice, in printing copies of the film. It is an objective of this invention to provide the parts of this mechanism in an arrangement permitting its use in the camera position for projecting and printing operations. A mechanism is required for switching on and off an electric light for exposing film in the camera at rates, synchronized with movement of the film, to avoid effect of flicker upon actors in the field of view of the camera. It is an object of this invention to provide the parts of this mechanism in an arrangement permitting its use for printing from negative film in the camera. A light is required that can be operated on and off almost instantaneously for view exposures. It is an object of this invention to provide means for utilizing such a lamp with the camera for projecting and printing.

A shutter is required to shut off the field of view while the film is being moved into position. It is an object of this invention to provide such a shutter arranged to be adjusted to shut off all the light from the field of view for printing operations and to provide multiple views of a picture frame during projection when the latter operation is elected. Continuously operating mechanism is required to feed the film into and out of the camera and to and from the intermittent mechanism.

It is an objective of this invention to adapt the former mechanism to printing sound track on the film from the negative while the pictures are being printed on the film.

Moving color filters are required for recording color values on a film. It is an object of this invention to arrange movement of the filters also for projecting and printing.

Novelty of the various parts mentioned above has been recognized in the following patent applications and patents derived from the original disclosure:

Serial No. 644,179, filed March 5, 1957, for Shutter Mechanism, now abandoned
Serial No. 644,419, filed March 6, 1957, Color Filter Mechanism
Patent No. 2,788,388, Method and Apparatus for Photographing of Television Images
Patent No. 2,725,784, Motion Picture and Sound Apparatus
Patent No. 2,697,971, Pullover Mechanism
Patent No. 2,695,546, Film Pulldown Mechanism
Patent No. 2,695,545, Motion Picture Camera and Feed Belt Patent No. 2,661,652, Motion Picture Apparatus and Method The novelty of the portions of the disclosure having been recognized and recorded, recognition of the novelty in their organization as a multipurpose group is pressed. As presented the various parts have a cooperative action. The values resides in the multiple use of the parts in various operations. Assembled as set forth in professional quality, the cost may be approximated at $10,000.00. To provide the various elements as three separate entities, camera, printer and projector, with equipment for recording and reproduction of sound, the cost may be approximated conservatively at $30,000.00. It is a purpose of this invention to make available in a packaged unit to the small operator multiple purpose photographic equipment at a price that will enable him to engage in business normally beyond his capital capabilities.

Motion picture machines are operated in diverse fields and with varied lighting conditions, such as motion picture studios, news reel recording, scientific investigation, stroboscopic engineering investigation, television screen photography and color photography. The usual motion picture machine and machines designed for special fields such as television screen photography have not been readily usable in other fields heretofore. They have lacked (1) flexibility in manipulation of the shutter; (2) flexibility in moving the film in the machine; (3) flexibility in phasing the electric drive with film pulldown; (4) flexibility in primary color recording; (5) flexibility in identifying the color with its film frame; (6) flexibility in sound recording and reproduction; (7) flexibility in film projection; (8) flexibility in the type of emulsion carrier; and (9) flexibility in exposure light control. To provide any one of these is an addition to the art. To provide them collectively, making them available simultaneously in a single machine is a further addition to the art, providing new, basic and pioneer photographic apparatus. The methods of photography using this apparatus are new and basic.

Further objects of the invention and novel features will be apparent from the following specification when considered together with the accompanying drawing in which.

Figures 30, 31, 32, 33, 34:
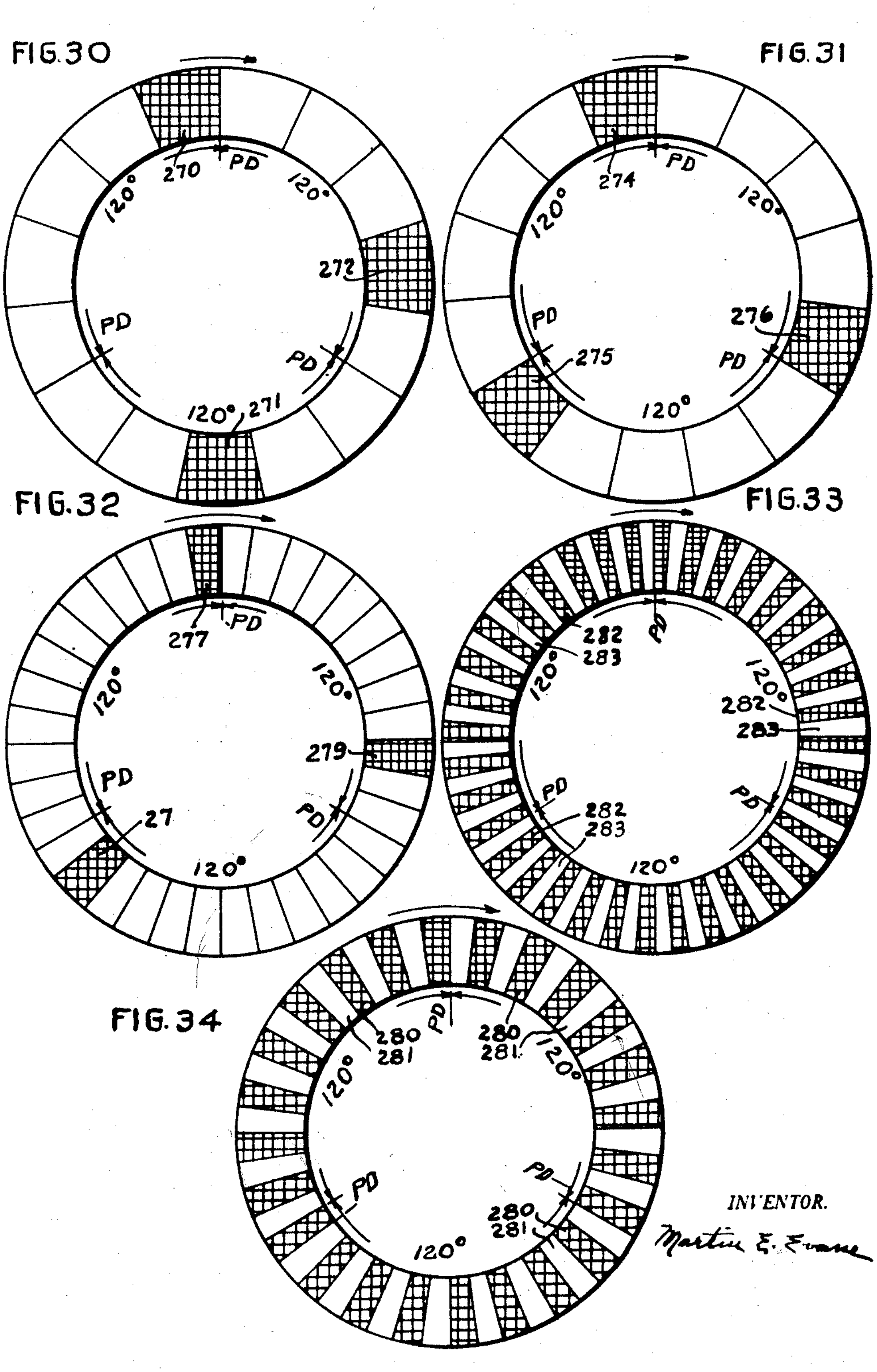

Fig. 30 is a back view of a light control chart for recording photographically 30 frame televised 3 color values occurring in varied sequence for 6 frame camera action.

Fig. 31 is a back view of a light control chart for 3 color values occurring in regular sequence for varied camera frame rates.

Fig. 32 is a back view of a light control chart for recording photographically 72 frame rate televised 3 color values at 6 frame rate camera action.

Fig. 33 is a light control chart for standard pictures at 6 frames per second taken by a flash light operating 72 times per second.

Fig. 34 is a light control chart for projecting pictures from a film moved 6 frames per second in the camera.

Figures 35, 36, 37:
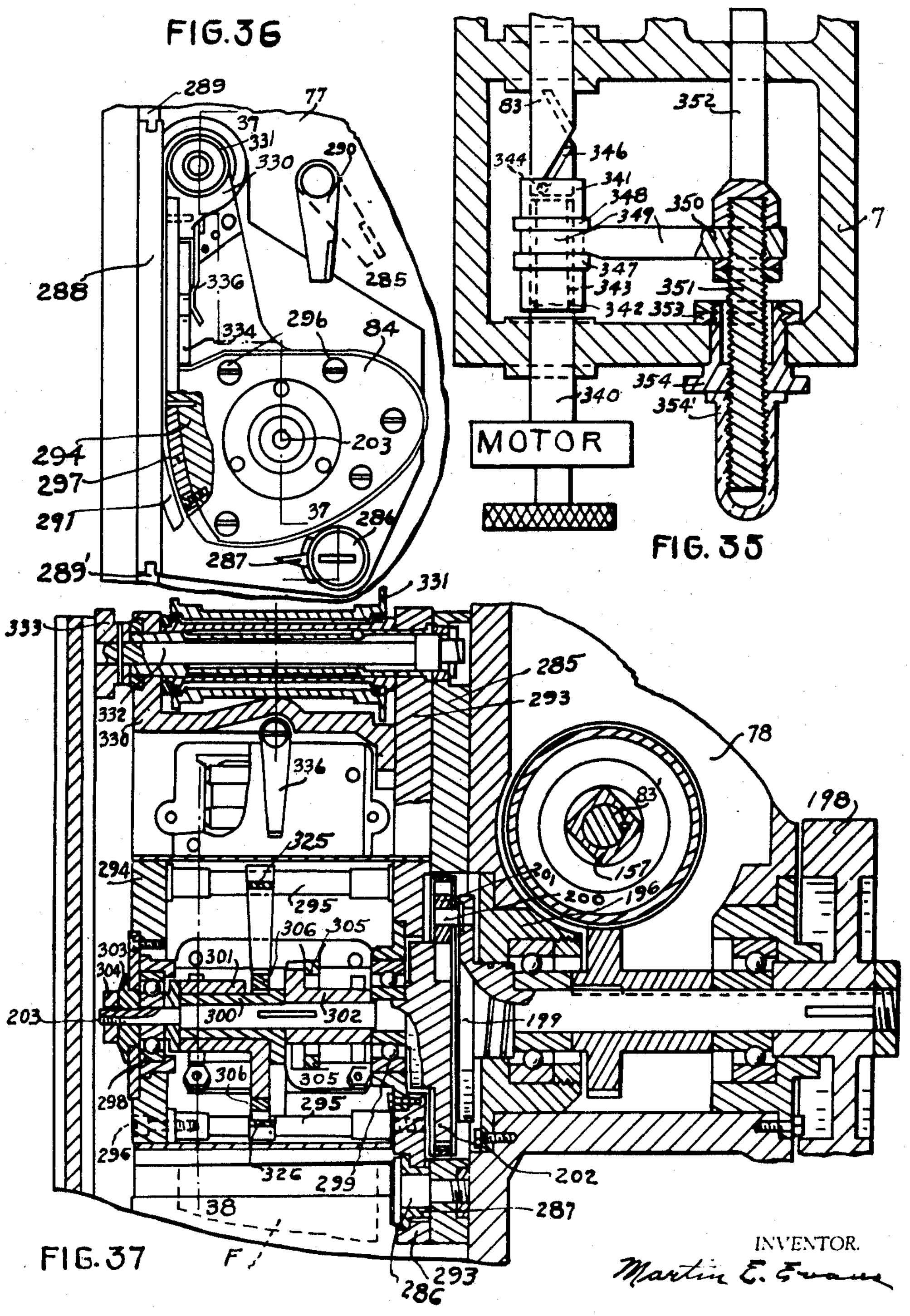

Fig. 35 is a horizontal sectional view of a phasing device between the motor and camera drive shaft.

Fig. 36 is a side view of a modified removable pull down mechanism originally shown in U.S. Patent No. 2,144,277.

Fig. 37 is a vertical sectional view of the pull down mechanism along line 37—37 of Fig. 36.

Figures 38, 39, 41:
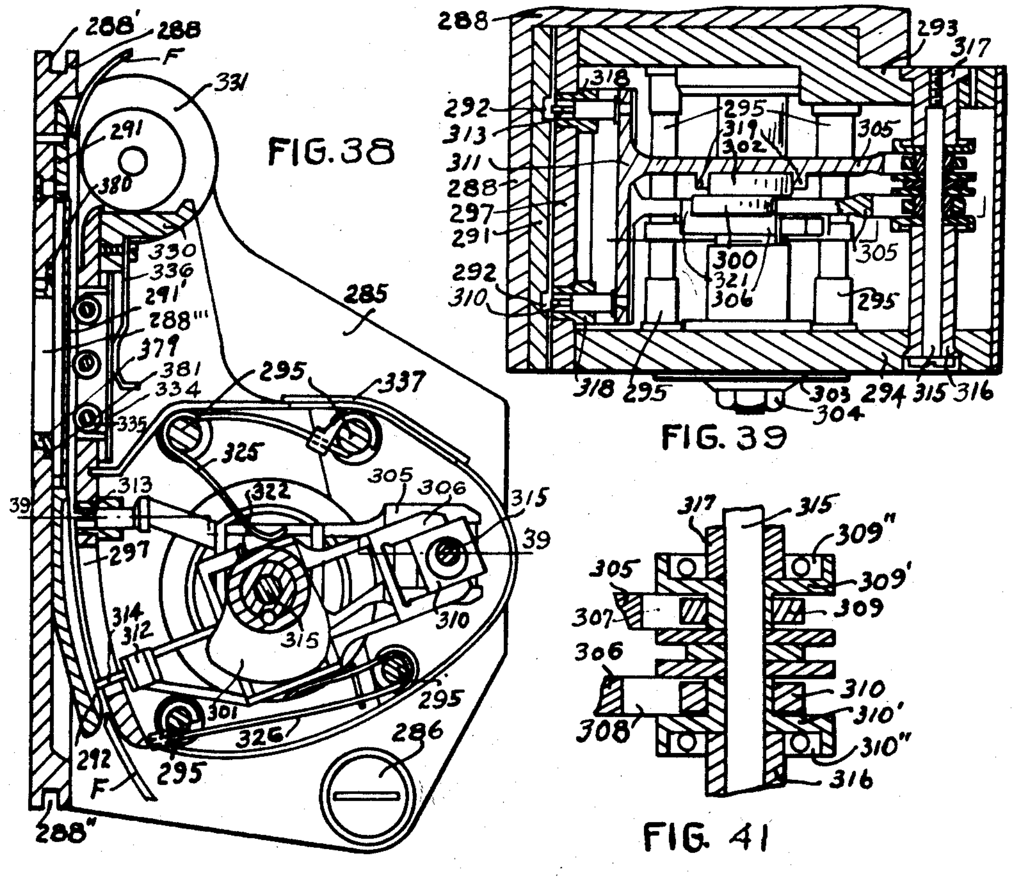

Fig. 38 is a vertical sectional view of the pull down mechanism along the line 38—38 of Fig. 37.

Fig. 39 is a horizontal sectional view of the pull down mechanism along the line 39—39 of Fig. 38.

Figure 40:
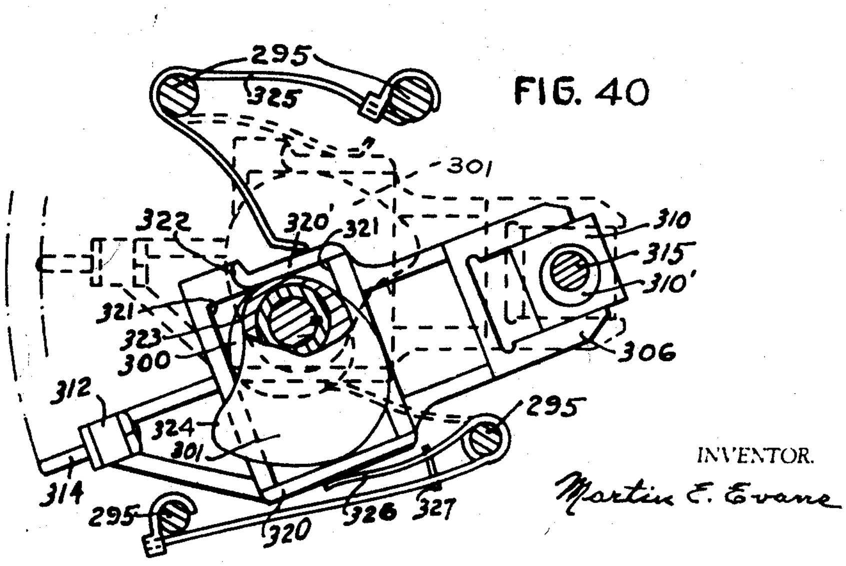

Fig. 40 is an enlarged partial sectional view through the pull down mechanism along the line 40—40 of Fig. 39.

Fig. 41 is an enlarged portion of Fig. 39.

Figures 42, 43, 44, 45, 46, 47, 53:
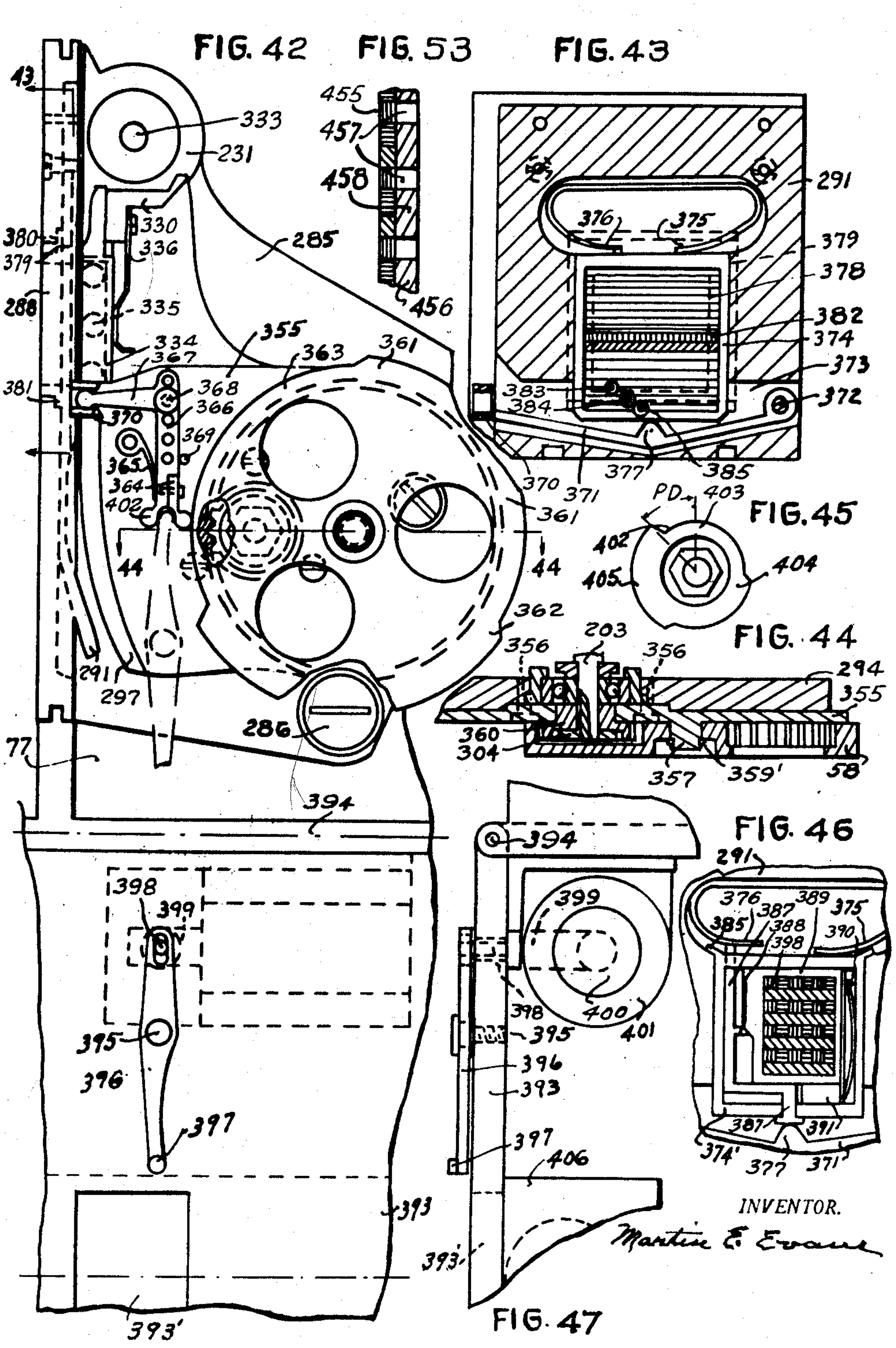

Fig. 42 is a view in vertical elevation of the pull down mechanism fitted with a color screen and its operating accessories.

Fig. 43 is a vertical sectional view of Fig. 42 along line 43—43 showing the color screen installation.

Fig. 44 is a horizontal sectional view along the line 44—44 of Fig. 42 showing the drive connection for the color screen.

Fig. 45 is a front view of a screen driving cam.

Fig. 46 is another form of color screen with its mounting.

Fig. 47 is an end view of the camera door swung downwardly showing the drive arm for the color screen operative from outside the camera.

Figures 1, 2:
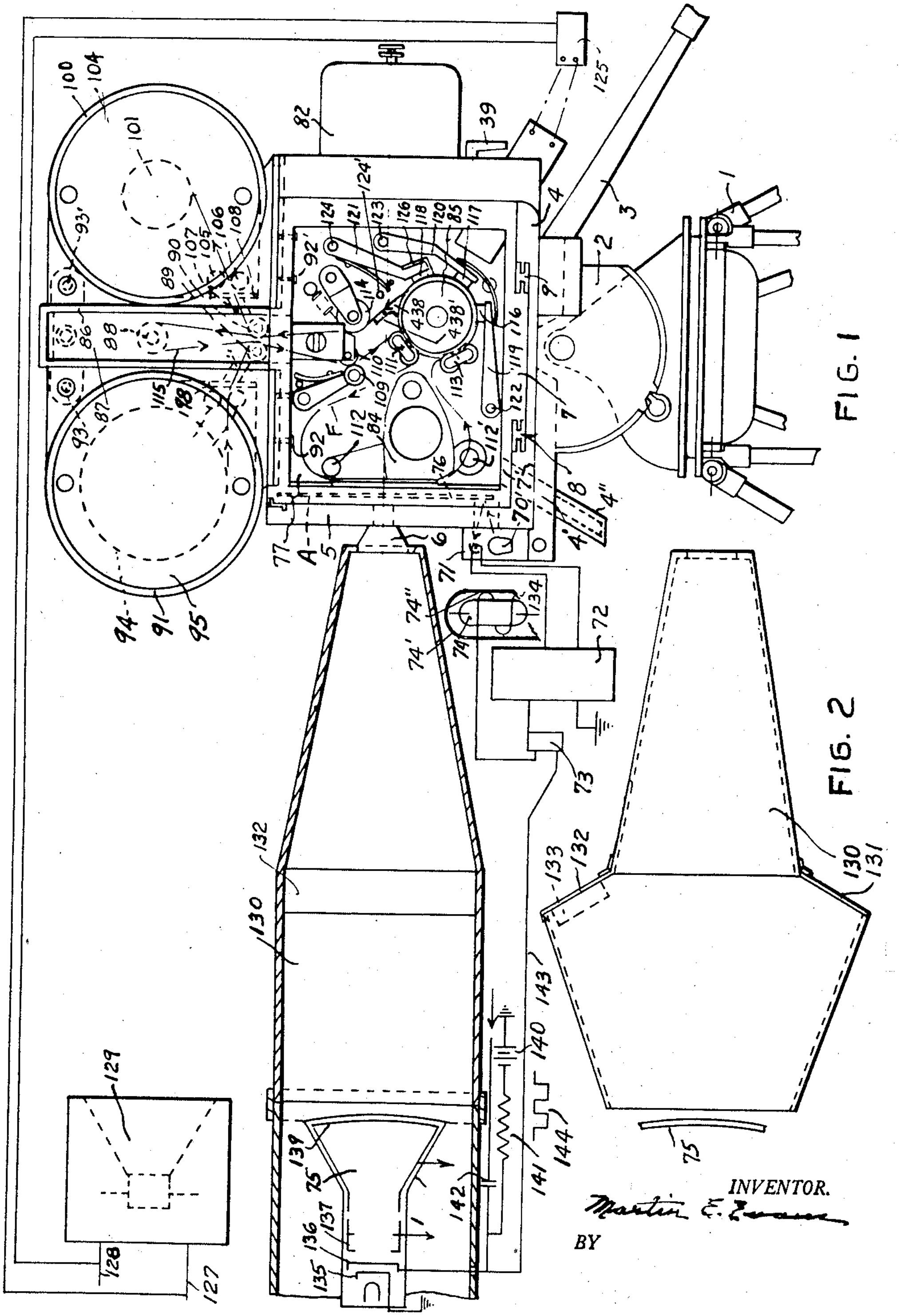
Fig. 1 is a front side view of a motion picture camera mounted on a tripod before a television receiver.
Fig. 2 is a plan view of a dark tunnel isolating extraneous light from that passing from the television receiver tube to the camera of Fig. 1.
Figures 48, 49, 50:
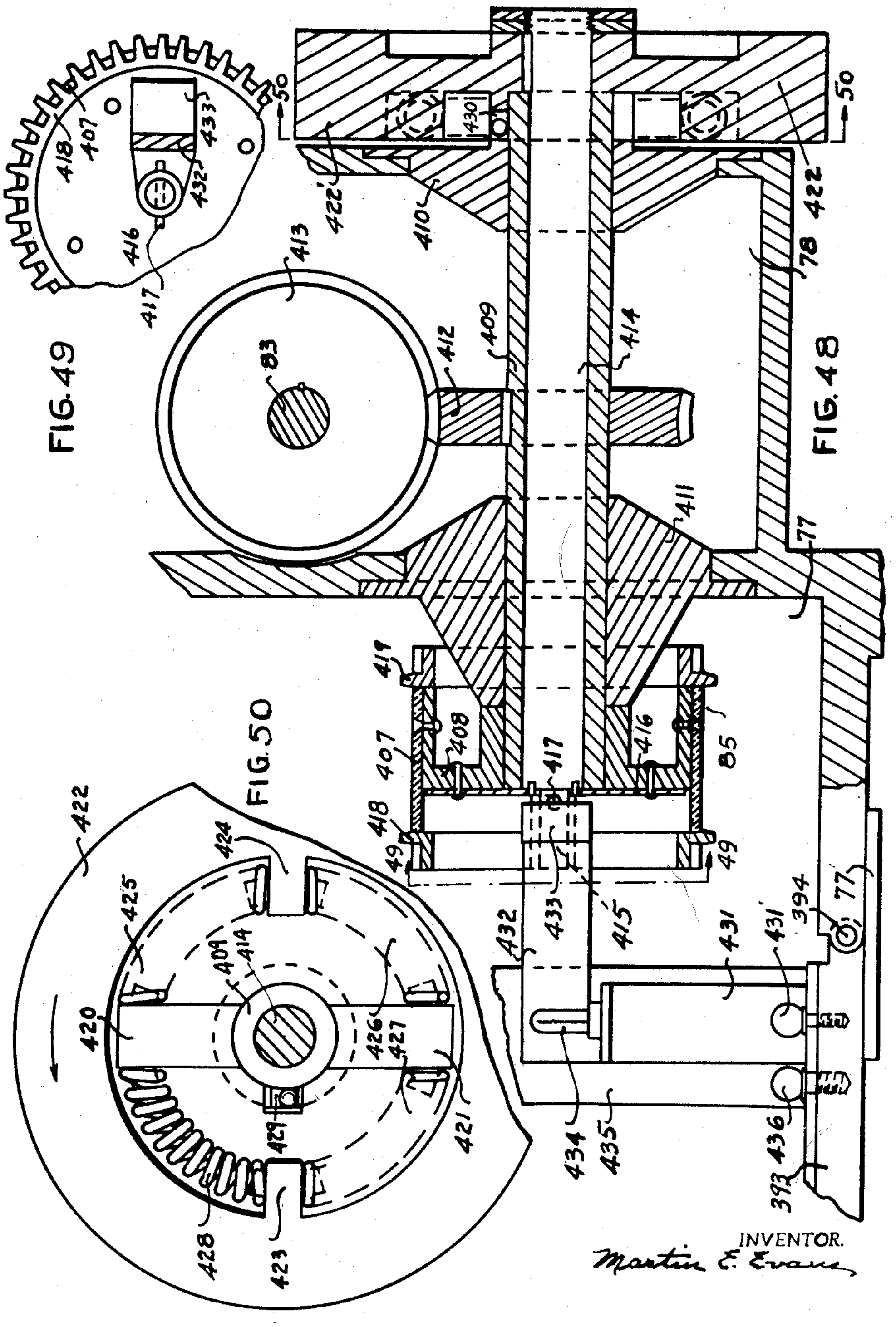

Fig. 48 is a vertical sectional view through the drive shaft for film movement as shown in Fig. 1.

Fig. 49 is a vertical sectional view along the line 49—49 of Fig. 48.

Fig. 50 is a vertical sectional view along line 50—50 of Fig. 48.

Figures 51, 52:
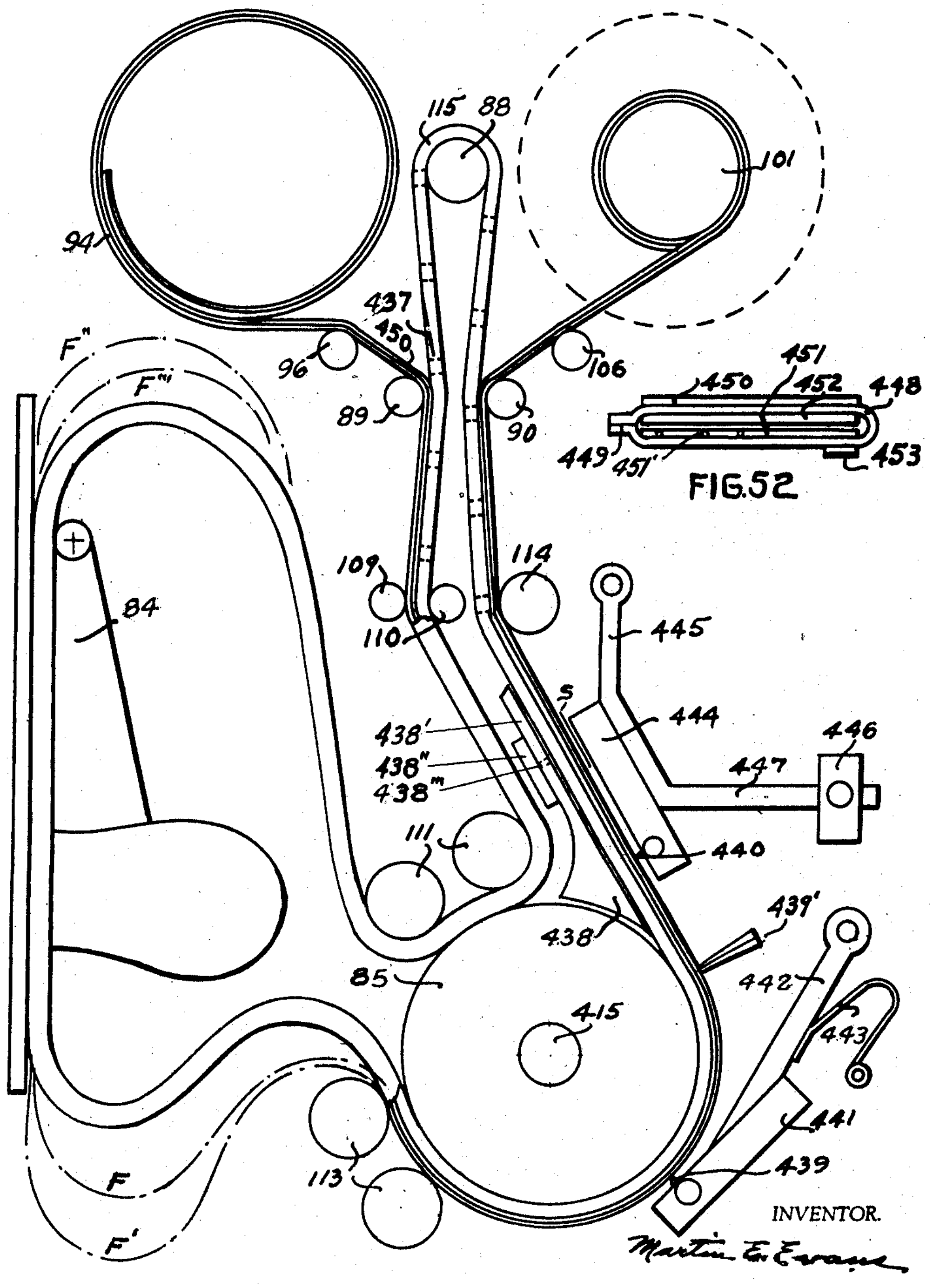

Fig. 51 is a diagrammatic representation of the film conveyor band and sound recorder.

Fig. 52 is an end view of the novel photographic element carried by the band.

Fig. 53 is a cross sectional view through a film and a blanking screen for color.

Figure 4:
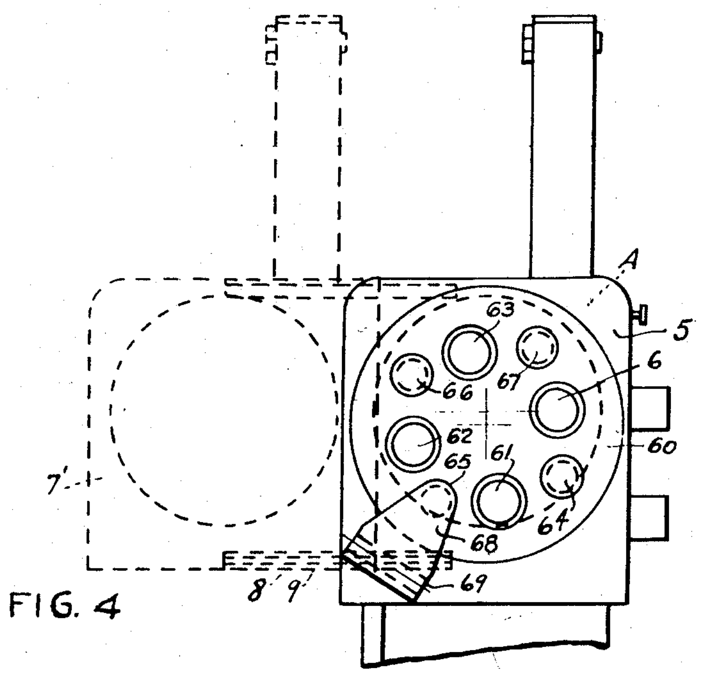
Fig. 4 is a front view of the camera of Fig. 1, showing the camera body shifted to one side to give access to a shutter chamber.

Referring to Fig. 1, on a tripod 1 is mounted a pivoted head 2 with an adjusting handle 3. The head 2 carries a camera base 4 with a front upstanding member 5 on which is mounted lens 6. On the camera base 4 rests camera case 7 with grooved beams 8 and 9 between them holding the case and base in sidewise alignment by tongues from the members 4 and 7 fitting the grooves of 8 and 9. The degree of sidewise movement is shown in Fig. 4, where the outline 7' of the camera case 7 rests upon the beams 8 and 9 which are approximately half way extended from the base 4.

The travel of the beams 8 and 9 is limited by beam pins 10 and 11 which are upstanding in grooves 12 and 13 respectively in the camera case 7 and depending in grooves 14 and 15 in the camera base 4. The pins are located approximately midway of the beams' length. Depending shoulders or ends of the case grooves 12 and 13 and upstanding shoulders or ends of the camera base grooves 14 and 15 by contact with the pins 10 and 11 respectively, limit the travel of the case over the base in the contracting direction. Stops 16 and 17 at the ends of the respective case grooves and stops 18 and 19 at the ends of the respective base grooves limit the travel of the case in the outgoing direction.

Mechanical means to shift the camera case with respect to the base on which the case rests is provided. Preferably it is located midway between the two beams 8 and 9 along section line 7—7 of Fig. 6, in which case to the base 4 shown in Fig. 7, a push pull rod 20 is anchored by a fastening 21. The rod 20 is in a channel bounded on its upper side by a wall 22 and on its lower side by a wall 23, the walls being a part of the camera case 7 which slides over the push and pull rod in consequence of the shift mechanism operation. The shift mechanism may be located in the end area 24 of the case, in which situation the push pull rod 20 terminates in an anchor loop 25 which is held by a pin 26 to the base 4. The upper wall 22 extends over the rod 20 only so far as is required to retain the rod 20 and a chain extension 27 thereof in alignment during operation of the shift mechanism shown in Figs. 10 and 11. The chain 27 extends around a sprocket wheel 28 and between guide rails 29 and 30 which terminate in a spiral arrangement 31 providing storage for the chain 27 during the closed position of the case 7. Although the chain storage is shown to the left of the sprocket, it may be located above the sprocket. The sprocket 28 is loosely mounted on a shaft 32 carried in bearings 33 and 34 in the case 7. The sprocket is driven by a pin 35 which it carries extending toward the rear of the case 7 and between the shoulders 36 and 37 of a lost motion cam 38 keyed to the drive shaft 32 which is manually turned by a handle 39. Handle 39 is pinned to shaft 32. Diametrically opposed to the drive pin 35 is a groove 40 into which fits a shoe 41 carried by a lever 42 pivoted to the case 7 by pin 43. From the pivot 43 the lever 42 extends horizontally to the shoe and then curves downwardly to connect with the lower link 44 of a toggle completed by upper link 45. The link 45 is a down projecting arm of a bell crank the arm 46 of which extends horizontally. The free end of the bell crank arm 46 carries a handle 47 which extends through the rear wall of case 7 above the shaft 32. The bell crank is pivoted at 48 to an upstanding member 49 slidable between upper pins 50 and lower pins 51 anchored to the wall of case 7. The lower end of the upstanding member 49 fits into a notch 52 in the rod 20 to hold the case 7 and base 4 in retracted position. The shoulder 53 on the lower end of the upstanding member is down pressed by a spring 54 anchored to the case 7. When the members 4 and 7 are extended over beams 8 and 9 the links of chain 27 provide notches for locking in extended position.

Figures 5, 6, 7, 8, 9, 10, 11:
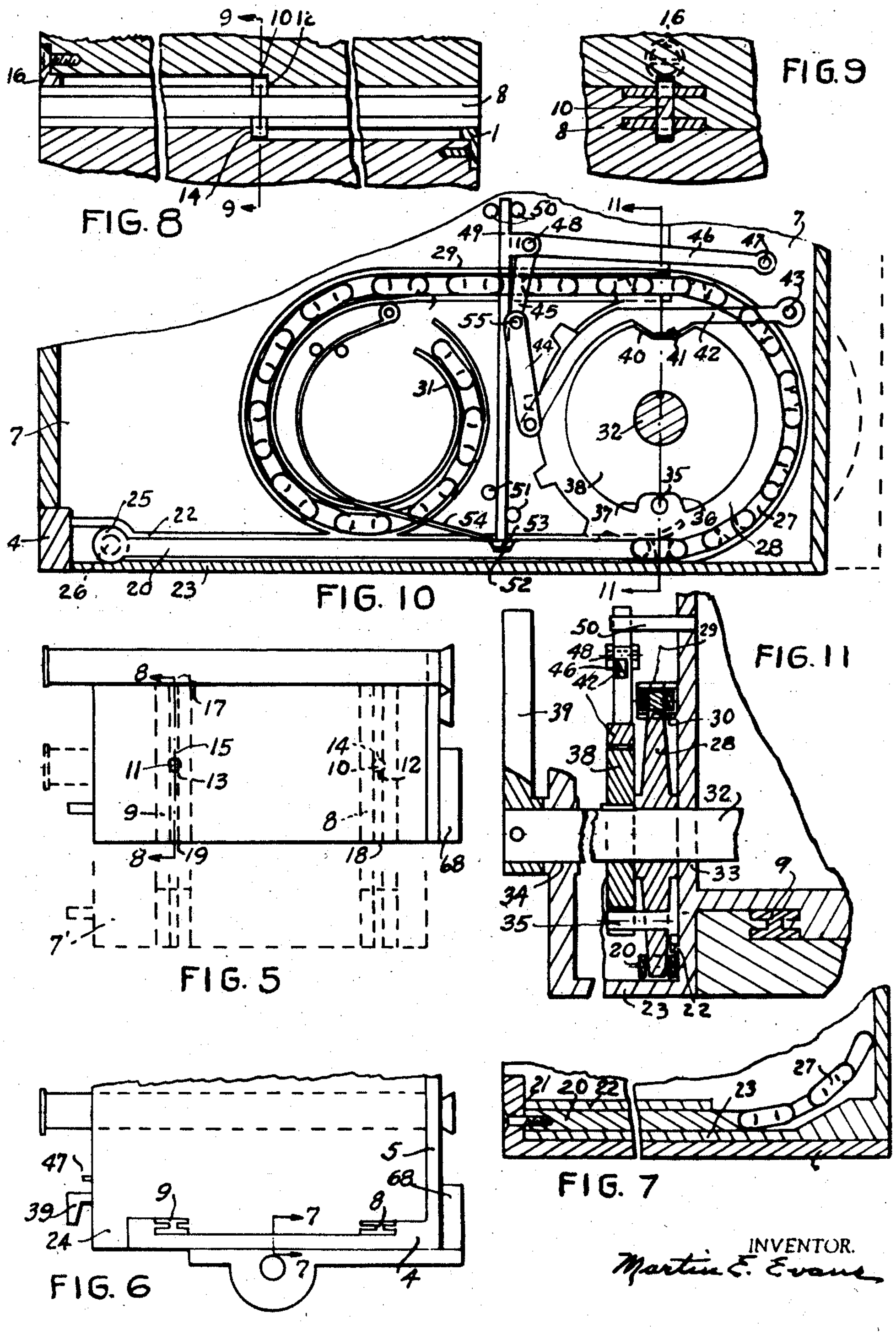
Fig. 5 is a plan view of the camera of Fig. 1, with the body in shifted position.
Fig. 6 is a partial back side view showing the position of a focusing telescope and support beams for the camera body of Fig. 1, during side shift positioning.
Fig. 7 is a partial sectional view of a side shift connection between the camera body and its support on line 7—7 of Fig. 6.
Fig. 8 is a sectional view longitudinally of a cantilever support for the camera body in side shifted position along line 8—8 of Fig. 5.
Fig. 9 is a sectional view along 9—9 of Fig. 8.
Fig. 10 is a sectional view of the camera side shifting mechanism.
Fig. 11 is a sectional view along line 11—11 of Fig. 10.

In operation, assuming the members are in positions shown in Fig. 10, a turn clockwise of shaft 32 by crank 39 causes cam 38 to engage shoe 41 and raise lever 42 and the toggle 44—45 and the shoulder 53 against spring 54, thus releasing the case 7 to slide along tie rod 20. Further clockwise movement of cam 38 engages shoulder 36 against pin 35 and forces chain links 27 down against tie rod 20. Further clockwise movement pulls the stored chain 27 from spiral 31 and feeds it into the channel provided by members 22 and 23 of case 7. Outward movement is limited by stops 18 and 19 in the base 4. Locks at intermediate points are provided by lifting handle 47 and lever 46 which breaks the toggle 44—45, the joining pin 55 of which rests against the upstanding member 49. When the toggle is broken the spring forces the stop into a chain aperture.

For retraction, the handle 47 is lowered, thus the lever 46 through the bell crank 45—44 re-establishes the toggle lock. Then the handle 39 and cam 38 are turned counterclockwise to make groove 40 engage shoe 41, raise lever 42, toggle 44—45 and so release the stop from holding position. Further counterclockwise action of cam 38 brings shoulder 37 against drive pin 35 and turns sprocket 28 to pull chain over the wheel from the channel between members 22 and 23. This action forces a telescopic action of the beams 8 and 9 between case 7 and base 4.

The outgoing action described separates case 7 from upstanding member 5 and makes accessible for adjustment the shutter disks and light control in the shutter compartment 76 of case 7 to be described later.

Figure 3:
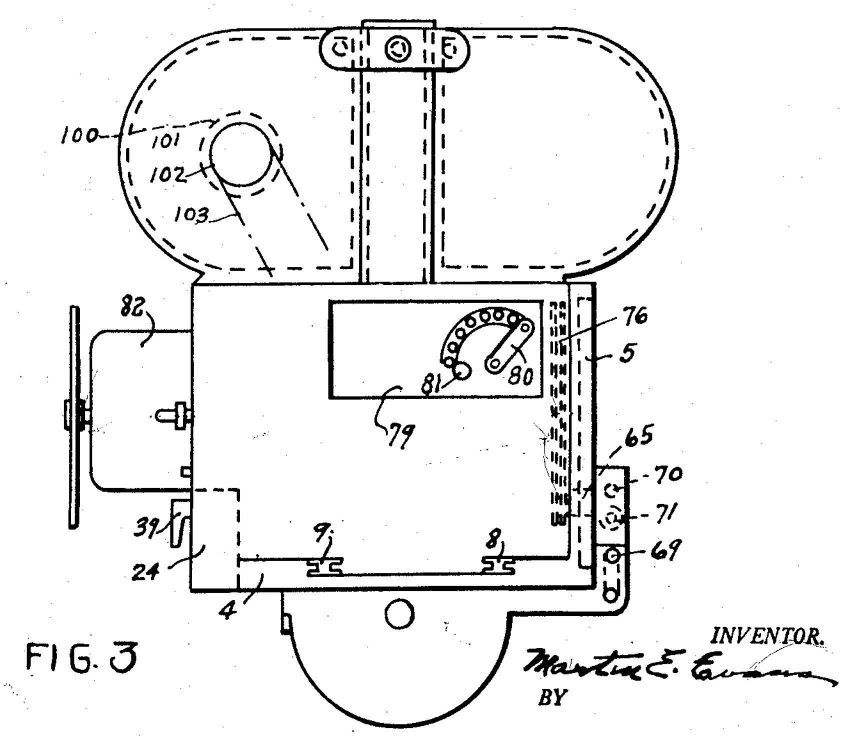
Fig. 3 is a back side view of the camera of Fig. 1.

Referring to Fig. 4, the upstanding member 5 on the base 4 mounts a turret disk 60 which carries four lenses 6, 61, 62, 63, lens 6 being shown in position before the film aperture. Between the lenses enumerated are apertures and removable covers 64, 65, 66 and 67. These apertures extend through the turret disk 60. Upstanding alongside the member 5 is a housing 68 with pivot 69 in the base 4. On pivot 69 member 68 swings away from member 5 to give clearance for rotation of disk 60. In the housing 68 is a light source 70 and a photoelectric tube 71 shielded from each other. As shown in Fig. 3 and elsewhere, light from source 70 passes through aperture 65 to a revolving disk, to be later described, where the light is either absorbed or reflected back to tube 71. Reflected light activates the tube 71 the current from which passes to an amplifier 72 and associated electrical devices. As shown in Fig. 1, from amplifier 72 a line through a switch 73 carries a signal to glow tube 74 or to a television cathode ray tube 75.

The camera case 7 has a front end shutter compartment 76 accessible as previously described, a front side film handling chamber 77, and a rear side gear driving chamber 78 with an adjacent compartment 79 for accessories such as electrical connections, switches, resistances, shutter adjusting lever 80 and clutch control 81. From the motor 82 mounted on the rear of case 7 extends a drive shaft 83 through the gear chamber 78 to the shutter A in compartment 76. Intermediate of the motor and shutter, cross shafts take off power to drive the film pull down mechanism 64 and the film feed sprocket 85 in the film handling chamber 77.

Referring to Fig. 1, on top of case 7 is a narrow vertical chamber 86 with removable cover 87 and at its bottom connecting approximately midlength with chamber 77. In the chamber 86 is an upper roll 88 and a lower pair of smaller rolls 89 and 90. To the left of the chamber 86 is a film supply magazine 91 held in place by bottom bolts 92 and top bolt 93. In the magazine 91 a film supply reel 94 is rotatably mounted and is accessible by unscrewing of cover plate 95. A pair of rolls 96 and 97 in the magazine 91 guide film as it passes through light trap 98 and aperture 99 into chamber 86 to roll 89. To the right of chamber 86 is a film receiving magazine 100 held in place by bottom bolts 92′ and top bolt 93′. In the magazine 100 a film receiving reel 101 is rotatably mounted and power driven through rear pulley 102 and belt 103 shown in Fig. 3. Magazine 100 is closed by screw plate 104. A pair of rolls 105 and 106 in the magazine 100 guide film as it passes from roll 90 on through aperture 107, light trap 108 to receiving reel 101. As the film leaves 89 it passes downwardly and between a pair of pressure rolls 109, 110 on to sprocket rolls 111 and sprocket 85, on in a loop to guide roll 112, on through the pull down mechanism 84 and out to a loose loop, then back over pressure rolls 113 and around sprocket 85 again and upwardly to buckle roller 114 and roll 90. In its passage from roll 89 around the path outlined back to roll 90 the film was in contact with an endless belt 115 which extends additionally from roll 90 up around roll 88 and back to roll 89 to complete the endless circuit. The belt is perforated and engages the sprocket and pull down mechanism the same as standard perforated film. When standard film is used the belt and film act as a unit. By matching the perforations the belt acts as a self threading device through the film handling chamber 77. Another use for the belt is described in connection with Figs. 51 and 52.

On the lower side of pull down mechanism is a mounting 112′ for a second guide roll 112, thus providing inlet and exit rolls for film and belt to accommodate tight operation of the belt through the pull down passage for high speed continuous operation in connection with stroboscopic photography.

Again referring to Fig. 1, around the feed sprocket 85 magnetic heads 116, 117, 118 are on arms 119, 120, 121 respectively, which are hinged on pins 122, 123, 124 respectively, and spring pressed against the film F on sprocket 85 and an associated guide as the film lifts from the sprocket. The film F carries material suitable for magnetic action by the heads to provide a sound record to accompany the film and be available for immediate replay. Head 116 is an erase coil fed with high frequency energy to demagnetize the recording material. Recording head 117 contains a main audio winding and an auxiliary high frequency coil, the latter in series with the erase coil to secure proper high frequency excitation. The audio winding is preferably energized with signal current from an audio amplifier 125. Head 118 which carries a shield 126 to isolate it from the recording head, supplies an amplifier, not shown, from which the sounds being recorded are recreated and thus an immediate check on the recording is provided.

As shown in Fig. 1, the camera is set up to photograph a television receiver cathode tube screen 139. The accompanying sound signals for the receiver are supplied by leads 127 and 128 to loud speaker 129 from which leads extend to amplifier 125 and to head 117 for recording action on the photographic film. A dark tunnel 130, shown in plan in Fig. 2, and in vertical section in Fig. 1, excludes extraneous light from the lens 6 and tube 75. Access to the tunnel 130 is provided with side doors 131 and 132 which may be opened to provide a full view of the tube 75. On door 132 is shown a light meter 133 for gauging the actinic value of the tube 75.

The original television images are usually lacking in contrast, therefore, it is desirable to exclude extraneous light to take full advantage of the contrast of the image on the screen.

A suitable circuit for energizing flash tube 74 is set forth on page 260 of Fluorescent Lamps, Forsythe and Adams, 1948 edition. The coil 134 around the tube 74 is a so-called "electric finger" to initiate the action of the tube. The action of the electronic switch for the finger 134 will be described later.

A suitable circuit for controlling the cathode ray tube 75 fits into the television circuits of the tube 75 which may be of the type having an indirectly heated cathode 135 and a control grid 136, a first anode 137 and a second anode 138. The picture appears on fluorescent screen 139. By means of a suitable battery 140 connected in series with a grid resistor 141 the grid 136 may be kept at a suitable negative bias. Through a coupling condenser 142 picture signals are imposed upon the control grid 136. To blank the tube the grid 136 may be driven highly negative by negative impulses generated by light 70 and photoelectric tube 71 utilizing light reflected from the source 70 to the tube 71 by shutter arrangement A in shutter compartment 76 of case 7. Other equally effective control circuits to tube 75 may be employed, utilizing the shutter switch.

The photoelectric tube 71 is connected to the ingoing circuit of amplifier 72 in the outgoing circuit of which negative impulses are carried through a conductor 143 to the control grid 136. These impulses are represented at 144.

Operations of the tubes will described later in connection with the shutter A in the shutter chamber.

The set-up in Fig. 1 is illustrative of the invention specifically applied to television. The inclusion of the tube 74 and control finger 134 controlled jointly with line 143 from amplifier 72 and members 71 and 70, and 76 or substitute, along with screen 139 and lighting means 75 behind the screen, provide a set-up analogous to that required for studio photography by intermittent light.

Figures 12, 14, 15:
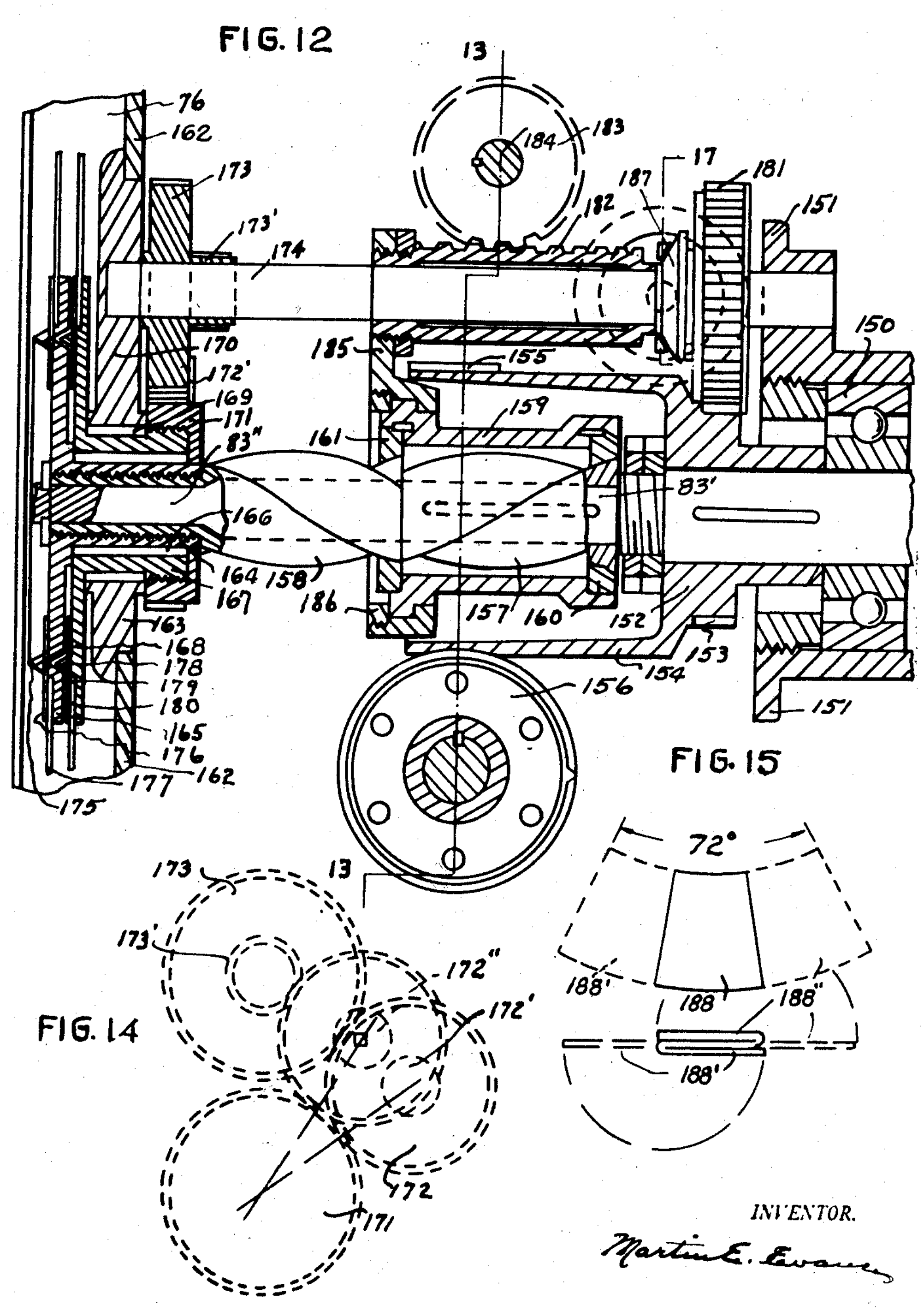
Fig. 12 is a partial vertical sectional view of the camera shutter and drive along the center of the shutter drive shaft.
Fig. 14 is a gear diagram of the final gear connection to the camera shutter.
Fig. 15 is a layout of a sector for the shutter.
Figures 13, 16:
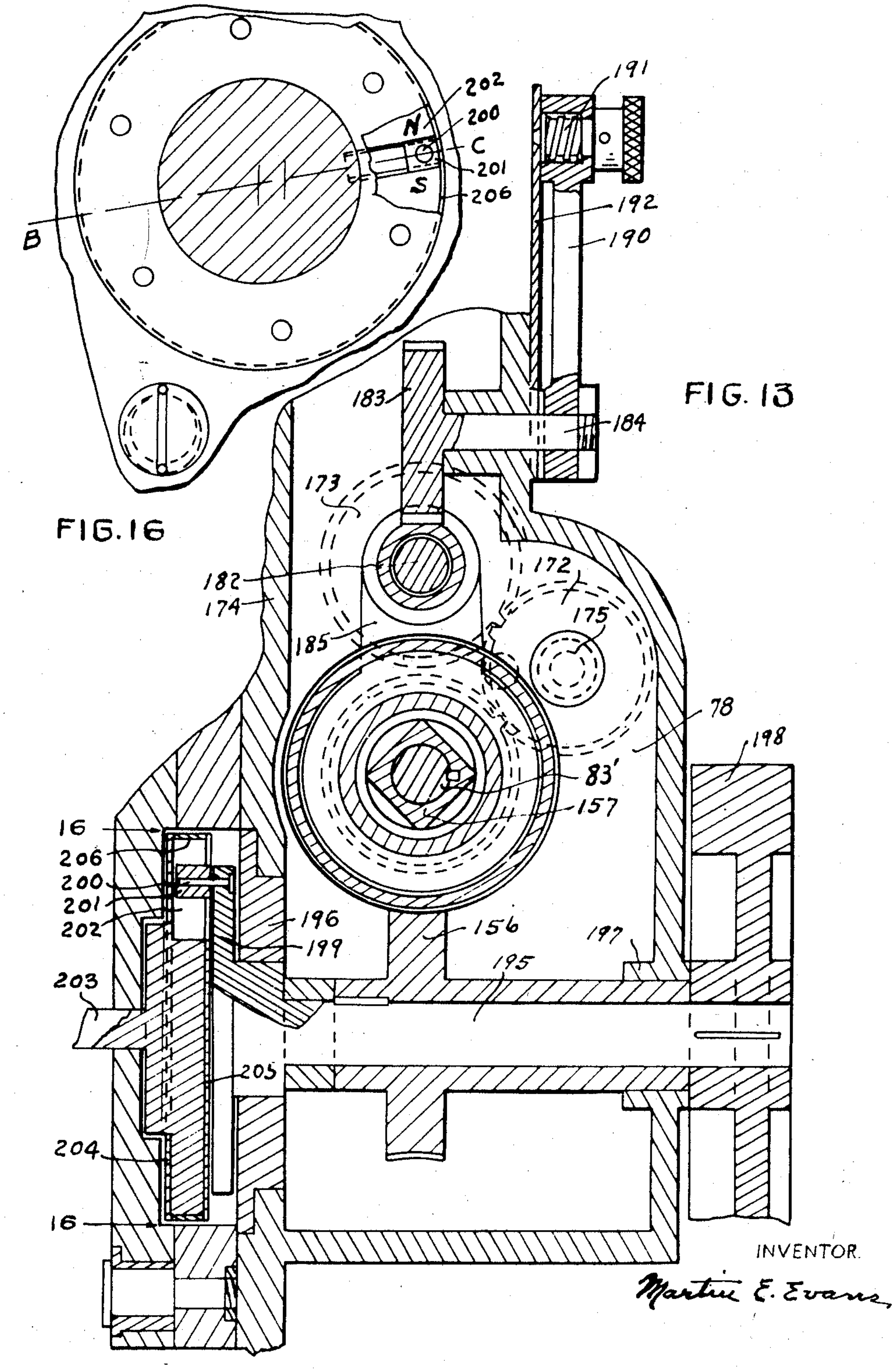
Fig. 13 is a sectional view along line 13—13 of Fig. 12.
Fig. 16 is a vertical sectional view of Fig. 13 along line 16—16 showing a driving connection to the pull down mechanism.
Figure 20:
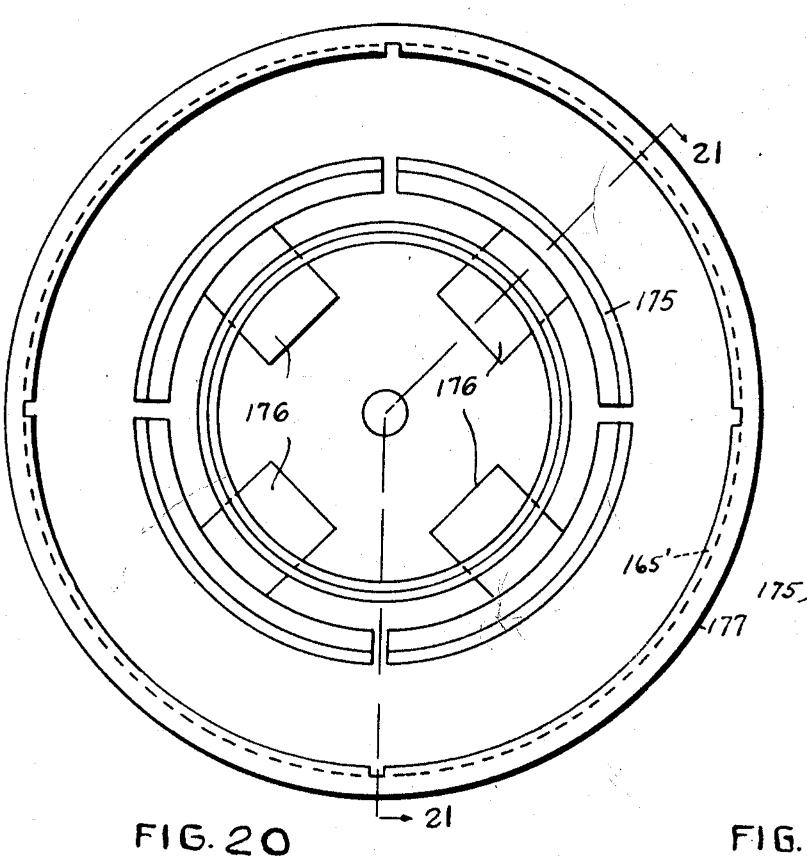
Fig. 20 is a front view of a shutter ring.
Figure 21:
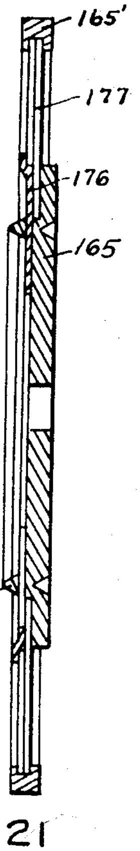
Fig. 21 is a sectional view along line 21—21 of Fig. 20.

Referring to Fig. 12, a longitudinal drive shaft 83 is shown supported by bearing 150 in a cross wall 151 in the gear chamber 78. Fastened to the shaft 83 is a hub 152 carrying a gear 153 on its periphery and a tube extension 154 with an exterior gear 155. The gear 155 meshes angularly with gear 156 fastened to a cross shaft which drives the pull down mechanism later to be described. On an extension 83' to shaft 83 and having a reduced diameter is a compound screw of two members 157 and 158. These screw members are in end to end relation to each other, member 157 being keyed to shaft 83' and member 158 being rotatably mounted on the same shaft. As shown in Fig. 13, members 157 and 158 are of square cross-section with the sides forming helices in relation to their axes. The direction of the helix of member 157 is the opposite to that of member 158. A tubular member 159 at one end carries a nut 160 fitting the helix of member 157 and at the other end a nut 161 fitting the helix of member 158. Members 159, 160 and 161 act as a long slidable nut over both helices and within the tubular member 154. Beyond the helix 158 shaft 83' extends in a reduced diameter section 83'' through wall 162 and bearing plate 163. On the shaft section of 158 is screwed the hub 164 of exterior shutter disk 165. Around the hub 164 a series of bearing rolls 166 are held by the hub 167 of interior shutter disk 168. Around the hub 167 a series of bearing rolls 169 are held by bearing 170 in the bearing plate 163. The rolls are held from longitudinal movement by member 171 screwed on hub 167 and which carries a gear on its rim. Gear member 171 through an intermediate gear 172 is driven by a change gear 173—173' on shaft 174 supported at one end in bearing plate 163. The intermediate gear 172 is supported on a two position stud pin 172'. The gears 173 and 173' have a 3 to 1 circumferential ratio and are adapted to be interchangeable in their position on shaft 174. The pin 172' occupies the position 172'' when the intermediate gear 172 is in mesh with gear 173'. The gear arrangement drives the shutters in opposite directions of rotation and at the same rate when gear 173 is active but at a 3 to 1 rate when gear 173' is active. The shutter disk 165 is provided with a circumferential groove on the back face thereof and opposite the groove a rib 175 on the front face. Slots in the rib 175 accommodate holding plates 176 which press circumferential member 177 against the shutter disk 165. Circumferential rib 178 on the front face of shutter disk 168 meshes with the groove in the back of disk 165. Slots in the rib 178 accommodate holding plates 179 which press circumferential member 180 against disk 168. Grooved rims 165' and 168' are positioned around the outer edges of members 177 and 180 respectively and have radial slots cooperating with radially disposed slots between members 178 and 179 respectively to hold in place sectors of a nature later described. This construction is shown in Figs. 20 and 21.

The rear end of shaft 174 is carried in a bearing in cross wall 151. The shaft is driven through a clutch by gear 181 meshing with gear 153. Slidably mounted on shaft 174 is a rack member 182 operated by a meshing gear 183 connected to shaft 184 supported in the longitudinal wall of gear chamber 78. The shaft 184 carries an exterior arm 190, Fig. 13, having a stop pin 191 in the end thereof spring pressed against a positioning quadrant 192 adjacent thereto. A yoke 185 at one end is screwed and locked to rack 182 and at the other end encircles tubular nut member 159 with a bearing having retaining ring 186. The bearing is adapted to impart longitudinal motion to the nut 159 while accommodating nut rotation. Such longitudinal movement is effected by movement of gear 183 and acts to rotate members 157, 158 and the attached front shutter disk 165 relative to the drive shaft 83 and its extensions. As shown in Fig. 12 the rear end of rack 182 is adjacent to the face 187 of the clutch cone 211 and in a position to hold the clutch out of gear with the result that the rim gear 181 turns idly upon the clutch structure.

The shutter members 177 and 180 are variously constituted, in some cases of solid metal, in other cases of transparent material and with pellicle mirror coatings and with light obstructing sectors with suitable retaining means. The smallest light obstructing sector provided is of 24° width shown in Fig. 15, where member 188 is shown in plan and end elevation. It is a folded 72° section of the ring having 24° sections 188' and 188'' folded over the middle 24° section. Suitable positioning means for sector 188 on the shutter are provided, as shown in Figs. 20 and 21, by slots in rim 165' and matching spaces between members 176 through which the sector is fed to the retaining grooves. In operation cone 211 may disengage the clutch throwing shutter member 180 into open idle position. Then lever 190 controlling shutter member 177 may be operated quickly to make a single exposure when such is desired. Referring to Fig. 13, the gear 156 is supported on shaft 195 having a bearing plate 196 adjacent the pulldown mechanism and bearing 197. The bearing 197 supports the over-hung flywheel 198 on extension of shaft 195. Adjacent the bearing plate 196 is an over-hung disk extension 199 of shaft 195 carrying a crank pin 200 supporting a drive block 201. The block 201 fits into a disk 202 on shaft 203 which operates the pulldown mechanism 84. The connection between the block and the disk 202 is in the nature of a radial slot covered wholly on one side by disk plate 204, partially on the other side by disk plate 205 and endwise by ring 206. The alignment of the shaft 203 relative to shaft 195 is offset so that the action of the drive pin and block is to provide an acceleration of rotary movement of shaft 203 on its down drive of the pulldown mechanism 84. As shown in Fig. 16, the sides of the slot for block 201 are in the nature of a magnet having N and S poles between which the block may be held in radial position when the pulldown assembly is removed from pin 200. Pin 200 may be removed when the camera is to be used at ultra high speeds and the pulldown is immobilized in which case the belt 115 operates continuously around guide rolls 112 and 112'. The offset of shafts 195 and 203 relative to each other and to the median line of the pulldown action is shown on line B—C in Fig. 16.

For continuous operation, the intermittent mechanism is rendered inoperative and serves only as a film guide. To this end the member 290 (Fig. 36) is swung to the dotted position shown, the mechanism is withdrawn laterally and suitable obvious adjustments are then made to make the drive ineffective. The pin 200 (Fig. 37) is shown with a shoulder to hold it in place longitudinally when replaced after withdrawal thereof. The pins 314 (Fig. 40) are shown with nut fastenings accommodating removal. With these pins removed the mechanism is turned so that the pins 292 (Fig. 39) are withdrawn from the film. It is thus seen that additional facilities are not needed for continuous operation of the film.

Figures 17, 18, 19:
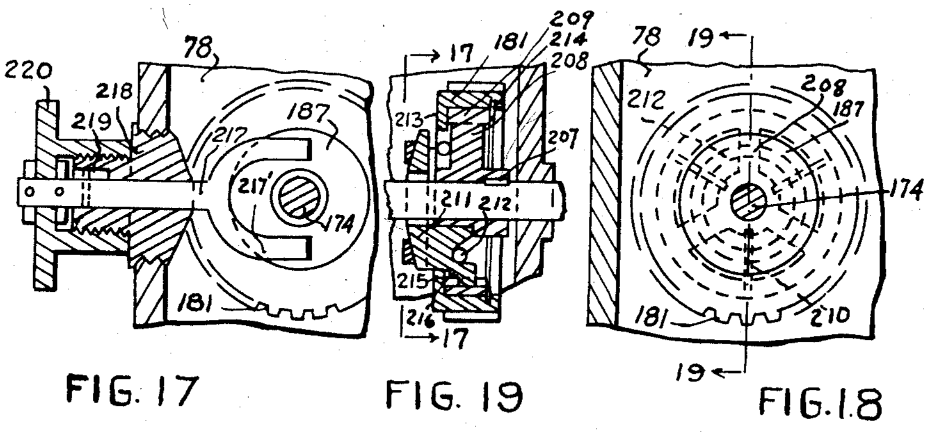
Fig. 17 is a vertical sectional view of Fig. 12 along line 17—17 showing the stop control for the rear shutter sector.
Fig. 18 is a vertical partial sectional view showing the clutch drive for the rear shutter sector.
Fig. 19 is a vertical sectional view along line 19—19 of Fig. 18 showing the clutch drive.

Referring to Figs. 17, 18 and 19, on shaft 174 is securely mounted hub 207 with three radial arms 208 extending to ring 209 supporting gear 181. Gear 181 is retained in position by flange 213 and snap ring 214. In the hub 207 are axial slots supporting wings 210 which extend radially to guide slots in ring 209. The wings 210 extend from cone member 211. Between the wings 210 and the arms 208 is a spring ring 212 which tends to hold the shoulders 216 of wings 210 in engagement with notches 215 in the gear flange 213 of gear 181. Against cone 211 is mounted a fork 217' with stem 217 extending at right angles to shaft 174 and through a supporting bushing 218 in the wall of gear chamber 78. The bushing 218 has an extension 219 internally slotted in which slides a pin through stem 217 to keep the latter from rotating. On the extension 219 is threaded a bushing 220 through which extends the stem 217. Through the stem extends a pair of pins, one on each side of the bushing 220 permitting the latter to rotate freely but transmitting axial movement to the stem 217 and thus to the fork 217' for adjusting the clutch. The clutch as shown is out of engagement. The clutch is also operated by the rack 182 but the mechanism just described is necessary to hold the clutch when the rack is removed from the cone 211.

Figures 22, 23:
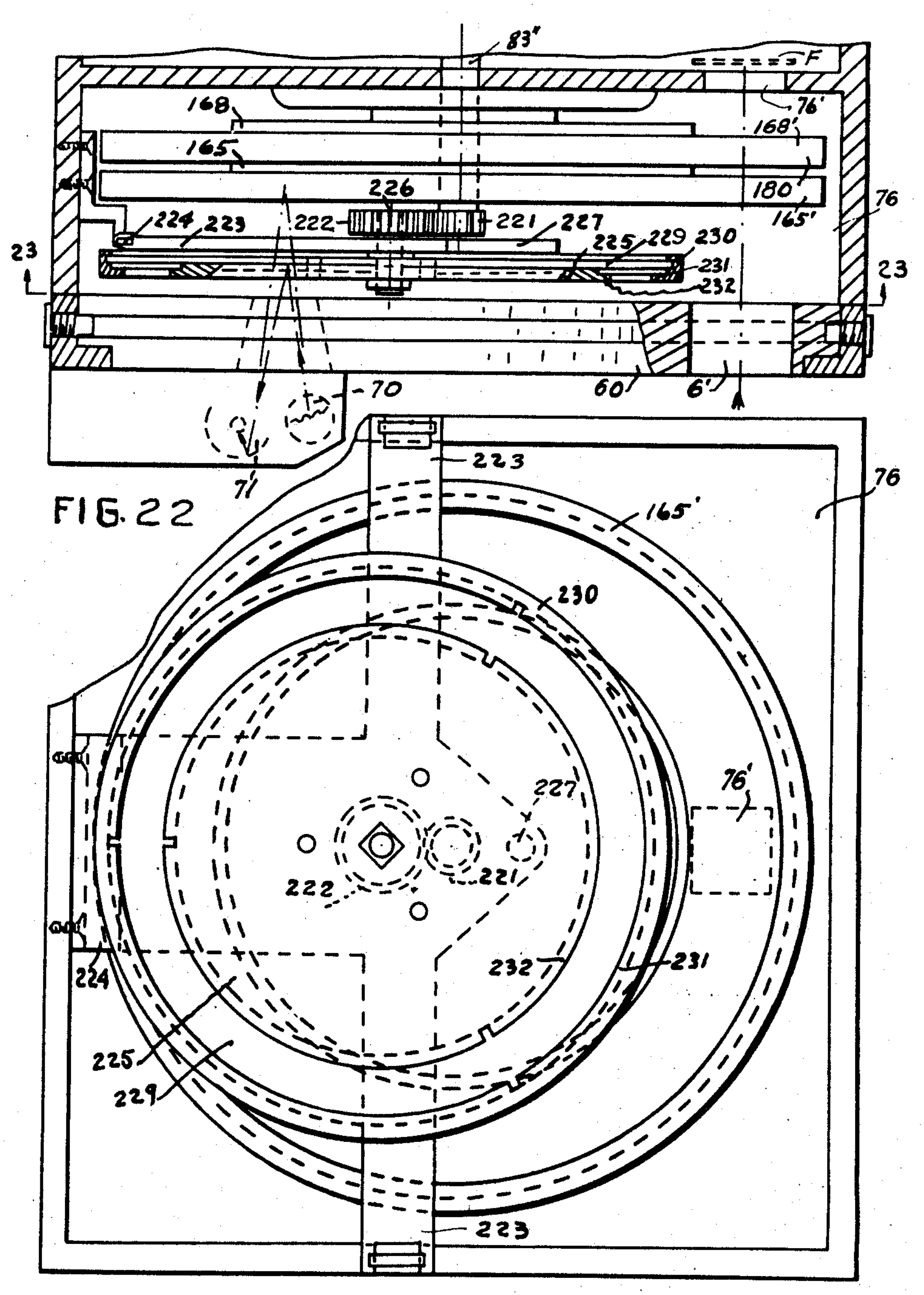
Fig. 22 is a partial horizontal sectional view through the camera shutter chamber.
Fig. 23 is a front view of the shutter chamber when open.

Referring to Figs. 22 and 23, in shutter compartment 76, the drive shaft 83'' is extended to carry a pinion gear 221 in mesh with gear 222 mounted on a support 223 hinged at 224 to the side wall of the compartment 76 and releasably anchored at the top and bottom of the compartment. The gear 222 is carried on a stud shaft 226 extending through a bearing support member 223. On the front side of the support 223 a rotating disk 225 is mounted on the shaft 226. The disk center is offset to the left from the shutter center to clear the light apertures 6' of the lens turret 60 and 76' adjacent the film. The gear ratio of the gears 222 and 221 is 3 to 1 so that the disk rotates one third as fast as the shutter disks. The shaft support 223 is provided with a bearing 227 offset to the right of the shutter center for supporting the disk in suitable position to rotate in front of the exposure aperture when such operation is desired. The disk is a composite arrangement of a metal drive plate 225 pressed against a transparent plate 229 pressed against a shoulder on shaft 226 by the nut thereon. Pins from the metal plate fit suitable apertures in the transparent plate to maintain joint rotary movement. A rim 230 around the circumference of the plate 229 has an inward flange 231 spaced to provide a circumferential recess. A flange 232 on the drive plate 225 is spaced from the plate 229 to form a circumferential recess. The recesses by flanges 231 and 232 face each other and cooperate to retain therein charts of suitable material and design inserted through radial slots suitably placed. Aperture 76' in the shutter compartment is positioned in alignment with the aperture 6' in lens turret 60. The charts for the disk 225 operate the electronic switch comprising light source 70 and photo-electric tube 71 and associated electrical agencies for timing the operation of flash lights, cathode ray tube scanning and shifting of color screens in the camera as later described. In the absence of the members mounted on shaft 226, disks may be mounted on the first shutter member 177 and member 165' in which cases light from source 70 will be reflected to member 71 as shown by the lines between the members noted.

Figure 24:
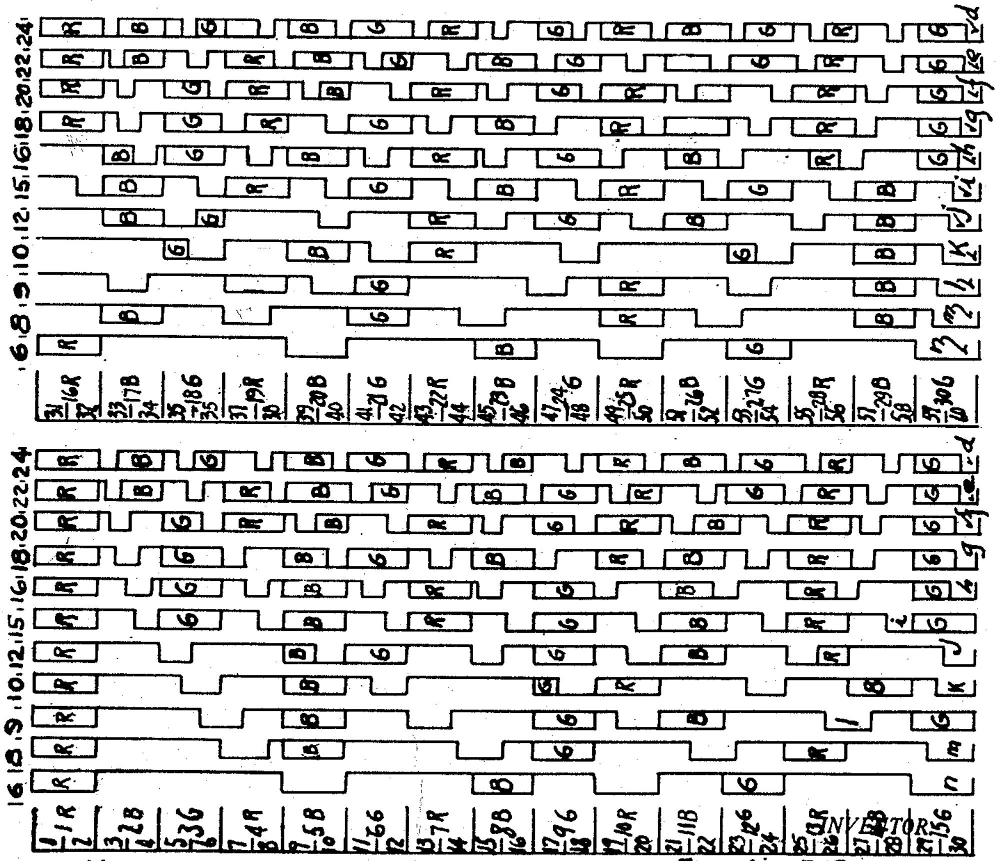
Fig. 24 is a divided time chart showing the relation between events on a 30 frame television tube screen and the operative activities of a motion picture machine operating at various rates.

Referring to Figs. 22 and 23 and Fig. 1, where the camera is set up to photograph a television tube 75, and assuming that that the camera is to take black and white pictures at the rate of 24 frames per second, inspection of the graph in Fig. 24 under heading 24 shows that full and fractional fields fit together to give two field periods between pulldown periods. The 72° shutter blanks out a half field for every picture frame, so that the shutter performance is satisfactory without control of the television electron beam. However, the television electron beam starts at the top of the tube and travels back and forth horizontally leaving a space between tracings until the bottom of the tube is reached, then it goes back to the top and traces between the lines previously made. Inspected through the camera lens, the top or first line appears at the bottom of the camera frame, therefore, the shutter should be open from the lower side upwardly since it is behind the lens, this to avoid any exposure delay due to the opening action of the shutter. To accomplish this the two 72° disks are disposed one in structure 165' and one in structure 168' so that their trailing edges separate at the lower side of aperture openings 76' of Figs. 22 and 23. Further, the tracing of the electron beam ends at the bottom of its frame and the light therefrom appears at the top of the picture frame, and the 72° sector closing down on the top side will cut off this action by an amount represented by the angular width of the photo frame, whatever it may be, say "*a*." It is accordingly necessary to remove an angular segment of the value "*a*" from the clockwise moving 72° sector which now becomes 72°–*a* in angular value . Now clockwise moving sector 72°–*a* and counter clockwise moving 72° sector close down on aperture 76' from opposite sides and meet at the middle. So it is, that the aperture opens without detriment to the exposure and closes in a period less than the opening time.

Normally the two 72° sectors open the aperture in its horizontal center line and close on the same line thereby opening and closing in one-half those times for a single sector.

Again assuming that the camera is to take color values at a 24 frame rate, an inspection of Fig. 24, graph 24, shows that action of the mechanical shutter alone is insufficient to limit camera recording to single color values on a camera frame. Also, the sequential appearance of the colors is unsatisfactory at that frame rate to get proper color value recording at 24 frame rate it is necessary to record at a lesser rate and to convert to the desired rate of 24. The rates and conversion repetitions are evident from perusal of graphs of Figs. 24 and 25.

Figures 26, 27:
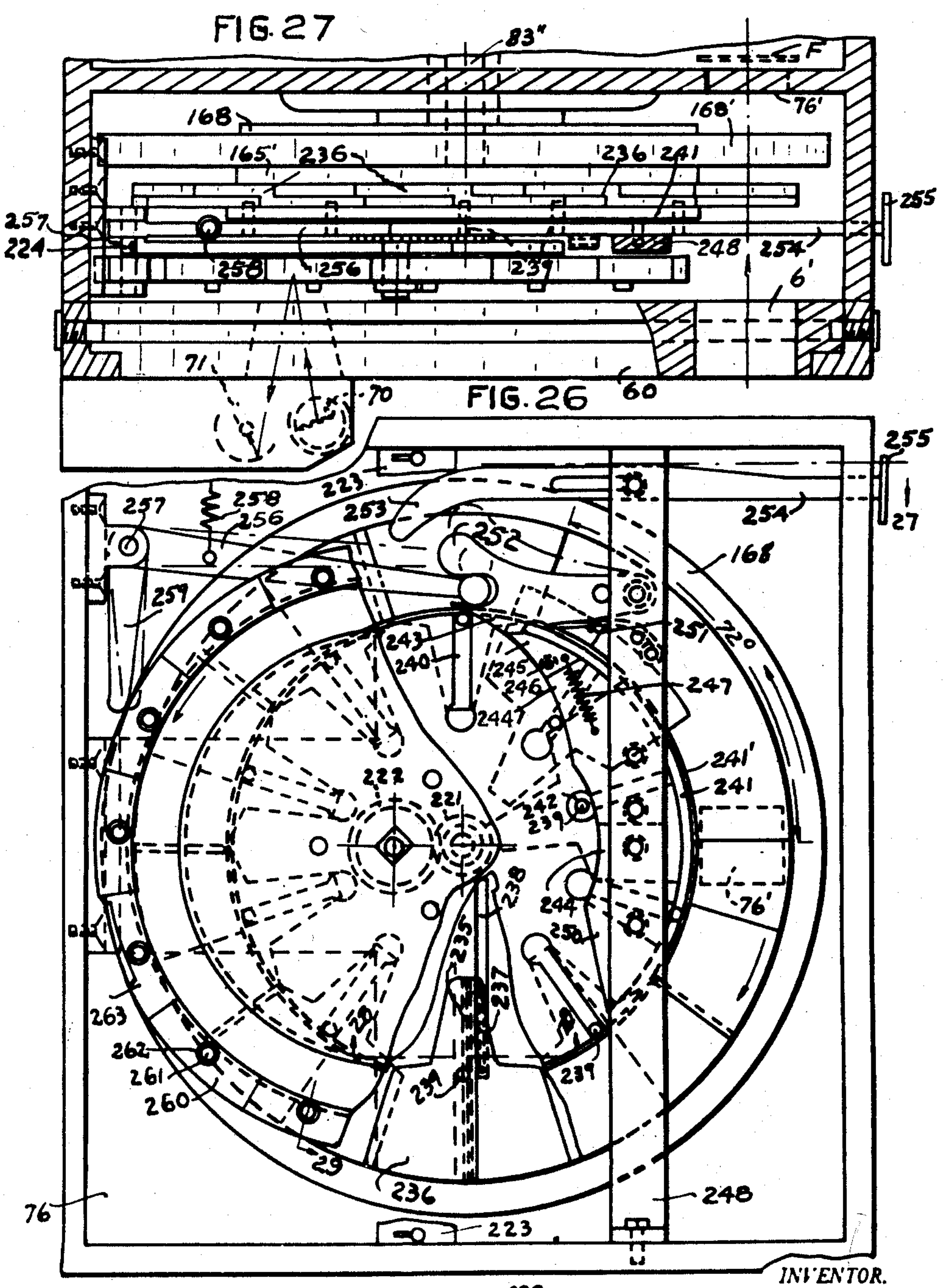
Fig. 26 is a front view of the preferred form of shutter with the shutter chamber open.
Fig. 27 is a partial horizontal sectional view through the shutter chamber on line 27—27 of Fig. 26.
Figure 29:
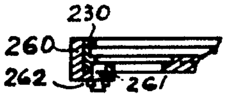
Fig. 29 is a sectional view of Fig. 26 along line 29—29 showing the cam sector for light control.
Figure 28:
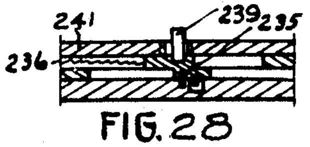
Fig. 28 is a sectional view of the Fig. 26 along line 28—28 showing overlap of radially movable sectors.

A preferred form of shutter is shown in Figs. 26 and 27. Disk 168 is driven by shaft and gears previously described. Disk 165' occupies the position of disk 165 previously described and is driven by the same members. Disk 165' is provided with radial inserts 235 at regular intervals which protrude sufficiently to form guides to overlying sectors 236 by fitting into grooves in the adjacent parts of the sectors and to propel the sectors in a rotary direction around the disk axis. Alongside the inserts 235 are grooves 238 extending radially to near the disk center in each of which is an extension spring 237 anchored at its outer end to disk 165' and at its inner end to the tail end of the sector 236. The sector 236 is fan shaped with the leading edge over-lapping the trailing edge of the adjacent advance sector. The overlap is just sufficient to complete the complete coverage of the shutter. The sector by reason of the overlap lies in two planes originating in the vicinity of the groove riding the insert 235. The two plane arrangement accommodates radial movement of the sector under impetus to an upstanding pin 239 at the approximate mid point of the sector. Pins 239 travel in slots 240 in a cover plate 241 over the sectors and are restrained at the outer edge of plate 241 by a rubber band 241' therearound which acts as a shock absorber to outward movement of sectors 236. At their inner ends slots 240 are enlarged to receive a ring 242 placed over a pin 239 to hold the sector at the inner point of travel. When the pins 239 are positioned with the rings 242 in place the springs 237 are extended in the slots 238 and urge the rings against the plate radially. The pins 239 extend beyond the plate 241 a distance sufficient to engage a pair of cams 243 and 244. Between these two members is a bridging cam 245 hinged at 246 to cam 244 and held by spring 247 to accommodate backward rotation of the sectors 236. Cam 244 is supported on upright 248 attached to the top and bottom of the chamber 76. Cam 244 has lower extensions 249 and 250 removably supported on upright 248. Cam 243 is pivoted on upright 248 and urged upwardly by spring 251. When the cam member 243 is in its upper position, an extension 252 contacts the angular portion 253 of a horizontal bar 254 slidably mounted on upright 248 and extending through the wall of chamber 76 to an operating knob 255. Below the extension 252 is a slot into which fits the end of an arm 256 mounted on one end of shaft 257 supported from the chamber wall. The arm 256 is urged upwardly by spring 258. On the other end of shaft 257 is mounted a depending arm 259 the free end of which contacts the circumferential surface of a series of cams 260 fastened by pins 261 and snap rings 262 to the rim 230 of the chart carrying combination. In place of cams 260 which maintain the arm 259 in an outward position and the arm 256 in a downward position, cams 263 are provided at suitable intervals to permit the arm 259 to move to the right, thus allowing spring 258 to raise arm 256 and cam 243 to permit pins 239 to pass to the outward face of cams 245 and 244.

With gears 221 and 222 operative the cams 260 rotate only one third of their circumferential path for each revolution of a sector 236 of the shutter. This gives three separate controls of the sectors 236. By dividing the one third path into five sections, each section represents 72° travel of the sector shutter, so that the length of sector 263 represents 72° on the shutter or two shutter elements 236. The space between adjacent pins 239 on elements 236 is 36° as illustrated so that the cam 263 has ample time to operate cam 243 to direct the pins 239 to a selected direction relative to guide cams 244 and 245.

The pins 239 being urged outwardly by springs 237 approach the cam 243 in a direction to receive shockless pressure to the inner face of cams 245 and 244 when the cam 243 is in down position as illustrated in Fig. 26. This inner path of the pins retracts the sectors 236 from over the aperture 76'. The retraction has a lead over the appearance of the sector in the vicinity of the aperture determined by the lead position of sector 263. When the cam 243 is in a raised position as in response to action of sector 263, the pins 239 pass to the outer faces of cams 244 and 245 and the sectors to which the pins belong pass over the aperture 76'. As the pins pass over the inner faces of cams 249 and 250 the sectors pass beyond the aperture area and are eased back by cam 250 to the outer sector positions. Removal of cams 249 and 250 permits the pins 239 to spurt to their outer position before the sector has cleared the aperture 76' and this is done for very short exposures at slow frame operation. The radial impact of the sector is absorbed by band 241' in contact with pins 239.

Referring to Figs. 26 to 29 inclusive, some of the operative arrangements are to be considered, as for example, shutter adjustments for projection operation. With all the pins 239 retracted radially and rings 242 thereon in plate 241 holding the sectors 236 away from aperture 76', and with rotary member 168 out of operative engagement by fork 217', the apertures 6' and 76' are cleared for projection operation, since the plate 168' is transparent and the light obstructing 72° segment thereon is positioned aside from the apertures when the fork 217' is as noted. Under these conditions and with a suitable flash disk held by flanges 231 and 232, rotation of the shutter through reflection of light from source 70 to member 71 effects suitable flashing of tube 74 mounted on the side of the camera temporarily. Light from the tube 74 reflected through the film passes through a suitable lens on turret 60 and on to a suitable screen not shown.

Again, consider rotary member 168 out of operation as just described and disk 165' in operation. Then referring to the cams 260 and 263, these may be arranged to retract or not retract segments 236 to the desired extent in increments of 36° of shutter angular movement to give the desired exposure. Flash controls may be activated if desired.

Again, color recording in black and white is taken as the operation desired. With gear 173' in operation and with red, green and blue color filters positioned on transparent disk 180 which now rotates 120° for each revolution of the shutter drive member 165', each exposure by shutter sectors 236 registers a primary color value which is recognizable on the developed film by reason of the position or outline of members 383, 384, 385, shown in Fig. 43.

Again, consider multiple shutter operation with flash light in studio work. With gear 173 in operation and 72° light obstructing sector in position against disk 180, with drive disk 165' operative with two sectors obstructing passage of light through apertures 6' and 76' and with shutter rotation 24 times per second, the exposure is 1/30 second; flash operation 24 times per second would give a single exposure per camera picture; however, the rate of flashing is objectionable. At least 48 flashes per second and preferably 72 per second of tube 74 are desirable by means of suitable flash disks retained by flanges 231 and 232. Assuming that the 72 rate of flashing is operative, it becomes necessary to reduce the period of shutter exposure to 1/72 second to get only one flash on a picture. To this end the aperture by the sectors is changed so that only two sectors 236 are retracted. Since there are three flashes for each frame at 24 frames per second it is necessary to choose which of the three will be utilized. This is done by manipulation of lever 190 so that the sector aperture is in alignment with apertures 6' and 76' when the selected flash occurs, and for the exposure apertures to be covered at other times.

Other operative adjustments and combinations are obvious, those just being mentioned are merely illustrative in a general way, and further elaboration would be tedious.

Figure 25:
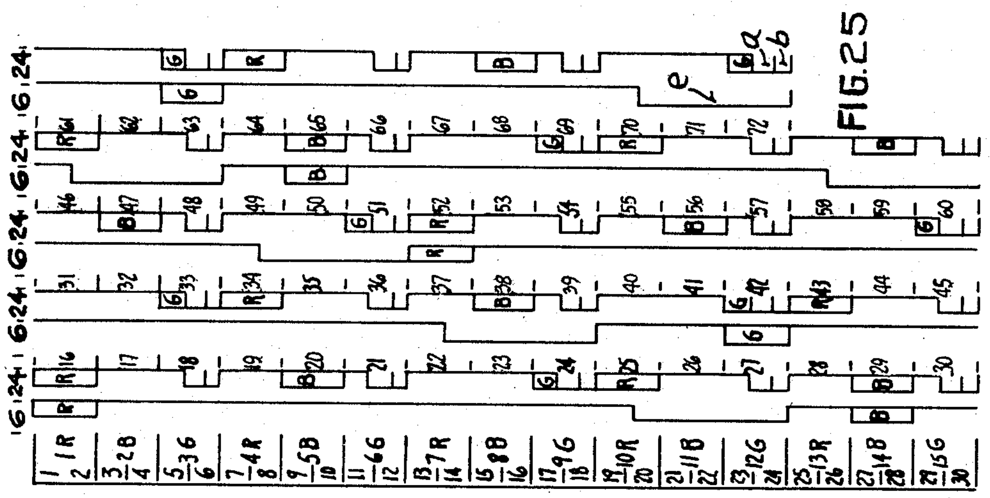
Fig. 25 is a chart similar to Fig. 24 for a television rate of 72 frames per second.

As illustrative of the charting of problems and their solution by this invention, reference is made to the recording of color television images on film. Figs. 24 and 25 record the time factors involved.

Referring to Fig. 24, this chart is in two divisions headed by frames per second operation of the camera ranging from 6 to 24 frames. Extending downward to the left of the headings are divisions from 1 to 30 in the first and from 31 to 60 inclusive in the second division. These divisions represent time occupied by a television field at the rate of 60 per second. Alongside these divisions are numerals representing the television frame time, two fields being used for a frame. Alongside the frame numbers occur the letters R, B, G, representing red, blue, green, the primary color occurrences which are transmitted by the noted fields and frames of television. The sequence of camera events and relative time periods are depicted in the vertical graph under each camera frame rate. The rectangular boxes represent the exposure periods. The line openings facing the right represent the pulldown periods, and the line openings facing the left represent dark periods additional to the dark pulldown periods. Thus under camera frame rate of 6 per second and opposite the fifth frame which is marked B we find in the graph the opening to the right indicating pulldown period. The pulldown period has been based on the use of a 72° shutter closure, the remaining 288° being open period. Also, the pulldown period is shown to occur after exposure, so it is shown in all cases as the last occurrence in the camera cycle. The color values appear in black and white as first recreated on the receiver tube screen. Hence the need for color screens in photographing the screen is absent. However, an indicator of the segment of color analysis being photographed is necessary and this will be described later whereby the suitable color element is coupled with the photographic record for color reproduction. Under the 6 frame column the first exposure is shown in rectangle R opposite frame 1. The next three frames must be blanked out until the mechanical 72° sector appears for the pulldown blanking. This is accomplished by direction of chart, Fig. 30, inserted in the control grooves provided by parts 231 and 232. The chart is divided into three sections of 120°, each section representing one camera frame. Each section is divided into five parts representing the five television frames occurring during the time interval covered by one camera frame. The sections representing pulldown period are marked PD. Then four out of five segments are available for recording action in accordance with the requirements indicated by chart of Fig. 24. Area 270 is non-reflecting and in passing past the aperture before elements 70 and 71 exerts no action in element 71. The remaining areas in the 120° sector are reflecting and direct light received from 70 to 71 and so blank out the unwanted light on the television screen. After the pulldown period 5B, on chart Fig. 24, two unwanted television frames 6 and 7 occur and are represented by two reflecting areas followed by light non-reflecting areas 271 which permits television frame 8 to be photographed. In the third sector, non-reflecting area 272 is preceded by one and followed by three reflecting areas each of which act to blank out unwanted images. The sequence of R, B, G, as thus outlined is observed to continue in the 6 frame graph. Another sequence of R, B, G, in the 6 frame graph is covered by chart, Fig. 31, where non-reflecting areas 274, 275, 276, appear in the same relative position in their sections as in the above manner. Charts for the camera rates 6 to 24 frames per second may be made up from Fig. 24 graphs.

The choice of camera frame rate for color projection depends upon the ultimate projection rate. For professional theater projection the frame rate is limited to 24 frames per second. The usual conversion from 30 frame rate to 24 frame rate involves split television frames which gives a scrambling of values when applied to color. This invention maintains pure color values by photographing full color frames and then arranging these in suitable combinations for 24 frame projection. Six frame pictures are each repeated 4 times, eight frame pictures are repeated three times, and twelve frame pictures twice. Fifteen frame pictures are all repeated with a loss of 6 frames from the repetition, such as 1—1—2—2—3—4—4—5—6—6—7—8—8—9—10—10—11—12—12—13—14—14—15—15. This gives repetition of the first two and the last two frames and alternate repetition of the intermediate frames. The method of repetition may be by photoprinting or by control of flash and pulldown mechanism.

Referring to Fig. 25, graphs for camera frame rates of 6 to 24 per second and a television rate of 144 fields or 72 frames per second are presented, similar to Fig. 24. The horizontal line in the pulldown portion of the graph indicates a division of the pulldown time, $a+b$ being the pulldown time for the usual running of the pulldown mechanism, "$b$" being the time for pulldown with overrunning operation, and "$a$" giving the additional interval of television picture made available for photography by the overrunning operation, so that full color fields are recorded as at 9G of the 24 frame rate.

For recording 72 frame television at 6 frame camera rate, reference is made to the chart, Fig. 32, where three 120° sectors are each divided into 12 areas, each area representing the time for a single frame of television. Areas 277, 278, 279, are nonlight reflecting and record R, B, G, respectively. The remaining areas are reflecting and so cut out the images in manner already described. From graph, Fig. 25, it is seen that over two television frames occur during pulldown time and that nine are available from which to choose for recording. Taking the first frame for the R recording on the first camera frame, the fourteenth frame for the B recording on the second camera frame and the twenty-seventh frame for G recording on the third camera frame a pattern is established for repetition. The other television frames occurring before the camera must be blanked out by the mechanical shutter and the supplementary electronic device controlled by the chart, Fig. 32.

For photography utilizing flash tube 74, with the camera operating at 6 frames per second and 48 flashes per second, 8 on periods and 8 off periods are required for the control circuit through members 70 and 71. The chart, Fig. 34, is so divided in each of the 120° segments, and areas 280 are non-reflecting while areas 281 are reflecting. The mechanical shutter must be adjusted and phased so that only one flash is recorded on a film frame.

From another aspect, this invention contemplates the use of the camera as a projector in converting say 24 frame film pictures to 30 frame projected pictures, projected on the mosaic of a television pickup tube not shown, where the transmission rate is 60 fields per second, for example. In this event, the pickup tube would occupy a position as of tube 75 in Fig. 1, and the light tube 74 would be mounted on the camera door in its operating position for projection. A control chart for tube 74 for the conversion would be constructed on the basis of providing 60 flash periods and 60 dark periods per second. An examination of the angular displacement of the chart shows that these recurring periods do not arise with the 3 to 1 gear ratio of members 222, 221, of Fig. 26, utilized to drive the chart on disk 229. With a gear ratio of 2 to 1 the chart revolves 12 times per second and has an angular displacement of 4,320 degrees. On the basis of 120 sectors in this interval, each sector would have a 36° angular dimension which can occur periodically in the circumferential path at suitably timed position to effect the required light operation. This assumes equal time intervals of light on and light off, a combined angular dimension of 72°. Now the periods of on and off are not equal. The on period must be brief, and occur during, say, the vertical blanking period in the operation of the pickup tube which is 8 percent at a maximum of the time for a single field. Eight percent of the field period of $\frac{1}{60}$ second is $\frac{1}{480}$ second or $\frac{1}{480} \times 4{,}320 = 9°$ sector dimension. There are, then on periods of 9° and off periods of $72-9=63°$. Hence to provide the chart, we divide the angular dimension into five sectors each of 72°, and then divide each of these sectors into two parts, one of 9° and the other of 63°. The 9° sector provides the activated period of the light 74 and the 63° period the dark period. The 9° sector is provided with a reflector that periodically directs light emanating from source 70 to photo tube 71 which activates light tube 74. It is, of course, understood that the camera is operated in synchronism with television tube in the manner well known to the art. Other rates of operation of the film and tube can be accommodated by due consideration of the timing of elements and charts as here illustrated.

In using the camera as a projector with flash tube 74 providing the illumination, and using 6 film frames per second and 72 tube flashes per second, chart of Fig. 33 is used. This chart has three 120° sectors each divided into 24 areas. Areas 282 are non-reflecting and areas 283 are reflecting, and they control the tube 74 as previously described.

With the pulldown operating at the rate of 6 frames per second, and with light flashes for either the projector, the camera or the television tube occurring at 72 per second, it is necessary for some means to accelerate the pulldown beyond the rotary angular rate of the uniform power drive. To this end a modification of the pulldown of U.S. Patent 2,144,277 is utilized as shown in Figs. 36 to 41, inclusive.

On an L-shaped piece 285, identified in Fig. 39, is hinged pulldown mechanism 84 by bolt 286 with eccentric washer 287 thereon adapted to position the pulldown mechanism relative to the front upstanding branch 288 of the L-member. Member 288 has top and bottom grooves 288′ and 288″ respectively, which removably support the structure in case 77 by engagement with case tongues 289 and 289′. The assembly is held against removal by pivoted member 290 attached to the case wall. Fastened in an inset in member 288 is a plate 291, the two having aligned exposure apertures 288‴, 291′, respectively, fitted with color screens to be described later. Grooves 292 in the plate 291 accommodate entrance of pulldown pins. The parallel back plate 293 and front plate 294 are held in spaced relationship by separators 295 screwing into plate 293 and receiving screws 296 through plate 294. Film guide plate 297 extends across the plates 293 and 294 and the intervening space. Plate 293 extends below 294 and has rests on the bushing 287 which pivots the pulldown to the L-member 285. The pulldown drive shaft 203 is carried by bearings 298 and 299, identified in Fig. 37. On the shaft 203 are mounted cam members 300, 301, 302 held in position by spacers terminating with exterior member 303 driven by the shaft and held in place by nut 304. The member 303 is variously shaped, as a washer, as a gear, or as a cam member in various illustrations to follow. Between the side plates 293 and 294 a pair of beam members 305 and 306 have their mid portions around the shaft 203 and possess forked end portions 307 and 308 respectively, which slide on blocks 309 and 310 respectively, at one end. At the other ends the beams possess cross members 311 and 312 respectively, with projecting pins 313 and 314 respectively. The blocks 309 and 310 are supported on adjustable eccentric bushings 309′ and 310′ respectively, in which holes accommodate insertion of pins for position adjustment. The eccentrics are supported on a tie rod 315 with spacer plates between them and with spacer bushings 316 and 317 on their outer sides which are held by the tie rod against side plates 293 and 294. Rod 315 threads into bushing 317. Adjacent the pins 313 on cross member 311, bushings 318 mounted on member 297 guide the pins in their movement and serve to support the unforked end of beam 305. Beam 305 carries upright side extensions 319 against which cam 302 operates to impart thereto a reciprocating motion. Beam 306 carries horizontal extensions 320, 320′ against which cam 301 operates and vertical extensions 321 against which ca m300 operates. Cam 301 moves the beam up and down. Cam 300 moves it back and forth. The combined action imparts an oscillatory motion. The offset position of shaft 203 relative to driving shaft 199 causes the shaft 203 to have an accelerated down stroke and a slow up stroke relatively. Acceleration beyond that due to the downward pressure of cam 301 is obtained by shortening extension 320′ relative to 320, providing shoulder 322 at the end of 320′ and cutting the heel of cam 301 between points 323 and 324 so that the shoulder 322 may ride down the face 324—323 under pressure of propelling spring 325. Spring 325 is anchored on one of the upper separators 295 and passes around the other which acts as a fulcrum. Referring to Fig. 40, the spring is shown in full line in the expanded condition at the end of a down stroke. In broken lines it is shown in the compressed state at the end of the upper stroke. The end of the down stroke is retarded by contact of beam 306 which is anchored to one of the lower separators 295 and passes around the other as a fulcrum. Clip 327 on spring 326 by change of longitudinal position may regulate the shock absorbing action of 326. Also, clip 327 may be similarly placed on spring 325, in which case the downward movement of beam 306 would be continuously under the pressure of cam 301, the accelerated upward movement of beam 306 being arrested by spring 325. It is this construction which permits the down stroke with a rotary movement of approximately 24 degrees. The opening diameter of bearing 298 in the side plate 294 is intended to accommodate change of cam 301 whereby the tearing down of the pulldown assembly is avoided for such replacement.

To upstanding plate 297 and plate 293 top cross support 330 is attached to form a support for top film guide roll 331. Through the center of roll 331 extends rod 332 with knob 333 on the end thereof adapted to turn the rod 332 to lock the structure of the pulldown in position adjacent the member 291. Opposite aperture 291′ in the plate 291 is an aperture in which fits a frame 334 in which fit roll 335 held in place by a spring 336 pressing against the closure of the frame 334. The rolls 335 operate to press the film toward plate 291. The pins 314 extend through the film and traverse grooves 292 in their downward path of travel. The interior of the pulldown enclosure is accessible by removal of cover plate 337.

Referring to Fig. 35, drive shaft 83 is shown terminating in abutment to the end of the motor shaft 340. A sliding tubular coupling 341 joins the two shafts. It carries at one end keys 342 which slide in straight longitudinal grooves 343 on motor shaft 340 and at the opposite end it carries key 344 which slides in helical groove 346 in the drive shaft 83. Both shafts have bearings in case 7. Between shoulders 347 and 348 on the coupling 341 a fork 349 engages the coupling and extends with stem 350 to a combination movable parallel to the aligned motor and drive shafts. The combination consists of a threaded rod 351 threaded into stem 350 and beyond to a stem 352. Rotatably mounted in the wall in case 7 and retained by lock nuts 353 bushing 354 carries an internal thread through which extends threaded rod 351. Member 352 in alignment with rod 351 has a bearing in frame of case 7. Rotation of nut 354 moves fork 349 and thus shifts the coupling axially along the two shafts 340 and 83 phasing the pulldown mechanism relative to the motor. Transparent thimble 354′ internally threaded acts as a lock nut on rod 351 by pressure against bushing 354 and gives by the position of the end of rod 351 an index of the phasing position.

Referring to Figs. 42 to 47 inclusive, the pulldown mechanism 84 is further developed to provide three color analyzing screens and actuating means therefor.

On the space plate 294 is mounted an assembly plate 355 by screws 356. On the plate is a stud 357 on which turns an internal gear 358 retained by snap ring 359′. Shaft 203 carries pinion 360 keyed thereto and retained by nut 304. The gear 358 encloses the pinion and nut and carries on its outer circumference a three place cam with segments 361, 362, 363, each a 120° arc and having faces radially separated a distance in accord with the movement they impart to a shoe 364 which is held against them by a spring 365. The ratio between gear 358 and pinion 360 is 3 to 1 so that cams move the shoe 364 once for each revolution of pinion 360. Shoe 364 is removably attached to the lower arm 366 of a bell crank of which the upper arm is 367. The bell crank is pivoted on pin 368 on plate 355. A stop pin 369 is provided to limit the travel of arm 366 under pressure of spring 365. Arm 366 is provided with holes for various positions of pin 368 to vary the relative length of arms 366 and 367. The free end of arm 367 fits in a fork 370 on the free end of a lever 371 pivoted at 372 in a recess 373 in plate 291. The recess 373 is covered by branch 288 of member 285. The recess 373 extends upwardly to house color analyzing frame 374 and then expands laterally to provide space for a spring therein, with ends 375 and 376 pressing downward against frame 374. The downward pressure of spring 376—375 on frame 374 is transmitted to lever 371 at contact point 377, through fork 370 to bell crank 367—366 to shoe 364 and thereby to cams 361, 362 and 263 as they rotate, so there is no lost motion in the transmission. This is essential since in some cases the movement of frame 374 by the cams is microscopic.

The frame 374 covers the exposure aperture outlined in dotted lines at 378 in Fig. 43. The frame is held in place by a frame 379 shown in cross section in Fig. 38. The frame has top tongue 380 and bottom tongue 381 fitting into suitable retaining grooves. The top tongue and its groove are relatively deep. A space in supporting member 288 above the frame top is provided to accommodate upward movement of the frame 379 so that lower tongue 381 may be removed from its recess and the retainer removed for insertion of frame 374 in its adjacent position. The frame 374 is provided with a plurality of cross strips of transparent material which act as color filters, arranged in successive groups of red, blue, green, red, blue, green. In response to the action of cams 361, 362, 363, the frame 374 is shifted by the intervening linkage so that the exposure aperture area is fully covered once by each color for each revolution of cam wheel 358. The frame 374 provides filter strips 382 to keep the exposure aperture covered during all frame movement up and down. At the bottom of the frame are three characters 383, 384, 385, identifying the color filters blue, red, green, respectively, when rotating filters on the shutter structure are used. These characters cast their outline upon the part of the film outside the area subsequently projected on the viewing screen, in the manner set forth page 229, Rose's Cinematographer Handbook of 1946. In the present instance of reciprocation of frame 374, the characters represent position one, two or three of the screen. In both cases the characters indicate the proper position of the color screens relative to the black and white film with which they are used for subsequent projection.

An alternate filter arrangement is shown in Fig. 46, where frame 374′ is shown with lugs 386 to limit the down travel under spring 375. Sliding member 387 extends through frame 384′ to engage spring 376 at the upper end and lever 371 at its lower end. Upward travel of member 387 is limited by its lower end structure. Midlength of the member 387 is a short projection 388 with an angular face adapted by its movement upward to force sidewise a contacting face on frame 389. Frame 389 is held against projection 388 by a spring 390 in frame 374′. Frame 389 is supported at its bottom end by member 391 which limits frame movement due to spring 390 to a horizontal direction. The frame 389 is provided with color filters 392 arranged in horizontal strips of green between which are strips made up of squares of the width of the green strip. The squares are alternately red and blue. The screen 392 is shown in the middle position of three which it occupies under management of springs 375, 376 and lever 371. Further upward movement carries all the structure within frame 374′ which shifts the green strip to a position over the one previously occupied by the red and blue blocks. Further downward movement from the position indicated in Fig. 46, lowers projection 388 which allows the frame 389 to be moved to the left by spring 390, and thus the change in relative positions of the red and blue blocks. Access to chamber 77 is through door 393 hinged at 394. On the inner side of door 393 is mounted a stud 395 on which rocks lever 396 which has at its free end an inward projecting pin 397. The other end of lever 396 has a longitudinal slot in which operates pin 398 which extends from the outside through a longitudinal light sealed slot in the door 393. The pin 398 extends at right angles to the door 393 to an arm 399 on the armature 400 of solenoid 401 mounted on the door 393. Energizing of solenoid causes the armature to operate the lever 396 and swing pin 397 back and forth. When the door 393 is swung about hinge 394 to a closed position the lever 396 swings to the dotted outline position of Fig. 42, and pin 397 fits between shoe 364 and extension 402 of arm 366. Swinging of lever 396 by pressure of shoe 369 moves the armature 400 and the effect of this on the coil 401 may be used to indicate screen movement electrically. Coil 401 may be activated by connection to a television receiver circuit to synchronize screen movement with the television color analyzer.

Where three exposures are desired upon a single photographic frame, the gears 358 and 360 are removed and the cam 402, shown in Fig. 45, is substituted on shaft 203. Such removal is readily effected by removing snap ring 359′ and nut 304. Cam 402 has large sector 403 and small equal sectors 404 and 405. The large sector 403 is larger than the other two by an amount represented by the indicated acute angle indicated by the arrows. This arrangement provides equal exposure periods for each position of the blanking screen. The relative angular size of the cams determines the relative exposures. The relative radial sizes determine the travel of the blanking screen. In some cases the travel is microscopic. The lower limit is in the neighborhood of 0.002 inch as established in Dufay color elements although this is subject to change in accordance with screen practice. On the door 393 is also exteriorly mounted focusing device 406 made available to the lens 6 by side shifting handle 39 previously described.

Referring to Figs. 48 to 50 inclusive, sprocket wheel 85 is shown as a composite structure made up of a transparent cylindrical element 407 mounted on an inner hub 408 to which it is riveted. Hub 408 is rotatably supported on tubular shaft 409 carried by frame bearing members 411 and 410 in the walls of gear chamber 78. Midlength of member 409 is mounted a gear 412 keyed to the tube and driven by gear 413 mounted on main drive shaft 83. Tubular shaft 409 is below and at right angles to drive shaft 83. Extending through the tubular member 409 is shaft 414 which has a reduced section 415 in the vicinity of hub 408. Over the section 415 fits plate 416 dowelled in the shaft 414 and there held by pin 417 to rotate therewith. Plate 416 is riveted to hub 408 and transmits motion thereto from shaft 414. Under some circumstances plate 416 and ring 418 are constituted as a unit and serve to drive the film supported on cylinder 408. Both ends of cylindrical member 407 have notches into which fit the teeth extending radially from rings 418 and 419. Adjacent the bearing 410 the tubular shaft 409 has radial arms 420 and 421 which fit within the rim 422′ of flywheel 422 supported on an extension beyond shaft 409 of shaft 414. Flywheel 422 is keyed and locked on shaft 414. Extending radially inwardly from rim 422′ of flywheel 422 are lugs 423 and 424. Between the lugs and radial arms and supported on extensions thereof, are springs 425, 426, 427 and 428 which establish yielding drive connection between tubular shaft 409 and axial shaft 414. In a cavity 429 on the inner side of the hub of flywheel 422 is carried a ball adjacent the face of bearing 410 against which it is pressed by a yielding member 430 in the cavity 429. The face inside the cavity against which the ball presses is angularly disposed so that the ball under the pressure of the yielding material is wedged between the flywheel 422 and the bearing plate 410 on the backward rotation of the flywheel. This lock against backward rotation is used only in those applications where motion is harmful as where needle recording of sound on film on sprocket 85 is undertaken.

In operation the irregularities of driving force between sprocket 85 and gear 412 are smoothed out by the floating action due to the springs.

The door 393 hinged to case 7 is held in a horizontal position by plate 77' when the door is opened for converting the camera to a projector. With such door position, thereon is mounted a standard 431 by thumbscrew 431'. Member 431 has an arm 432 fitting over the extension 415 of shaft 414, thus supporting an angularly disposed mirror 433 within the tubular transparent member 407 in a position to reflect light from a tube 434. Light from tube 434 reflected by mirror 433 is directed through member 407 and against a film thereon in continuous motion. The light passing through a sound record path on the film is utilized in means not shown to recreate the recorded sound.

On door 393 standard 435 is held by thumbscrew 436 in position adjacent pulldown member 84 to support tube 74 and a mirror not shown which directs light through the aperture uncovered by removal of roll holder 334 shown in Fig. 38. The light passing through the said aperture passes through the film between members 291 and 297 of the pulldown and out to the projecting lens mounted on turret 60. Suitable condensing lens adjacent flash tube 74, also, is contemplated to be in the set up.

Referring to Fig. 51, an enlarged view is shown of the conveyor belt 115 on which is provided a flap or guard 437 with the tail in the trailing position and beneath which the lead end of film F is to be tucked for threading through the mechanism in the circuit back to roll 90. At roll 90 the flap is lifted and the lead end of the film F is threaded around reel 101. As the conveyor 115 and accompanying film pass from feed sprocket 85 and over shoe 438 the shoe acts to lift the conveyor and film off the sprocket and to support the film in position for sound reproduction by stylus 440 acting in a groove produced by preceding stylus 439. Member 439 is electromagnetically activated to engrave on the passing film a groove of varying depth or varying width or a combination in a manner well known to the art of recording sound. Member 440 operating in the groove just formed agitates associated electromagnetic means which causes variations in an electric circuit that form the basis for sound reproduction. The stylus 440 immediately following the engraving operation provides an immediate check on the adequacy of the engraving operation. Stylus 439 in case 441 on arm 442 is pivoted to swing toward the sprocket 85 under the impetus of spring 443. Stylus 440 in case 444 on arm 445 is pivoted to swing toward shoe 438 under the impetus of adjustable weight 446 on arm 447.

Referring to Figs. 51 and 52, a composite film is shown comprising a longitudinal strip of material such as cellophane for example, folded along its longitudinal axis as at 448 and having its adjacent folded edges 449 held together as by Scotch tape type of adhesive permitting subsequent separation. Outer surface 450 carries an adhesive of the Scotch tape type such as is adapted to separation from conveyor 115. Inner surface 451 is coated with a photographic emulsion. Inner surface 452 is coated with developer and fixer. After exposure it is only necessary to introduce moisture between the surfaces to effect quick development. The emulsion within the envelope is only slightly adhesive and is readily removed if such action is desired, making the envelope again available for use. On the outside of the envelope adjacent to the emulsion 451 is a strip of material 453 adapted to sound recording. If the recording is by stylus the strip is in the nature of a wax or resin coating adapted to engraving. If the recording is by magnetic means, the strip is of material accepting alteration by magnetic means and suitable to the requirements for permanent record. The thickness of emulsion is determined by transparent particles 451' embedded in the emulsion which act as separators when the two surfaces of the envelope are pressed together.

Referring to Fig. 53, showing a vertical section through a film 455 and a blanking screen 456, the strip openings 457 are in width one-half the closed spaces 458 and are in length the width of the film. The blanking screen 456 may replace color screens 382 in frame 374 of Fig. 43. In such position the screen is shifted to three positions per photographic frame by the cam of Fig. 45, when suitably positioned on shaft 203. With such a positioning, red, blue and green filters are positioned on shutter disk 168 which rotates once before the screen 456 while the screen occupies the three positions before the film 455. The color filters are so positioned that the shift from one color to another occurs as the screen 456 shifts from position to position. By this arrangement the light through the colored filters affects the film in red, blue and green sequence over the whole film frame and provides three color analysis of the exposure light on a single frame. After development and conversion to a positive, the film may be projected through screen 382 in frame 374 with the frame being immobilized by removal of operating shoe 364.

The term light used in this application is intended to include those electromagnetic waves which are visible and invisible, capable of affecting a photographic emulsion, and some of being absorbed by a moving shutter.

This application has particular reference to a combination camera, projector or printer in which dual sound systems are provided. In the art previously described where dual sound systems are operative on a film strip simultaneously and concurrently with exposure of the film for recording pictures, a displacement of the sound records longitudinally of the film has been practiced with respect to each other and to the picture. Standards for such displacements have been set up and for the sound recordings run to two picture frames. It is a further object of this invention to provide dual sound recording agencies and reproducing agencies that operate from a common point on the film. It is further intended that the record shall be available for reproducing sound promptly after the recording has been effected.

Referring to Figs. 1, 51 and 52, film base 448 carrying member 453 is carried around sprocket 85 and over shoe combination 438, 438', 438'', 438''', without belt 115, so that the base 448 slides along members 438, 438'. With member 453 premagnetized uniformly and inscriber 439 operative so as to remove a full thickness of the magnetized material, variations in the physical quantity of magnetized material per increment of length are provided such that their passage under member 118 placed in position of member 444 in Fig. 51 induces in the member 118 the magnetic variations suitable for initiating sound reproduction. Assuming the heavy line at 453 to be the thin layer of magnetized material and the light space back of same a soft transparent backing permitting the spade or diamond point inscriber 439 to pass beyond the magnetized layer, the before mentioned variations are readily provided. With the face of member 118 that contacts the magnetic strip highly polished or of a reflective character of high quality, the member 118 is enabled to provide an assist to the reproduction of sound. The tail 438' of shoe 438 is the face member of a translating device 438'', for example, such as is set forth in detail in the figure of Patent 1,872,965 to E. W. Kellog, in which face member is a slit 438''' positioned opposite to the reflecting surface above mentioned. The translating device 438'' is provided with a constant light source providing light through slit or aperture 438''' to the reflecting surface of member 118 which returns the light variably (due to the variations scribed in the magnetized material) to a photoelectric device in the housing 438. The photosensitive device is suitably associated with agencies not shown to complete the reproduction of sound. Thus it is that the variations in the magnetized material passing the point 438‴ serve to activate agencies on both sides of the film for sound reproduction closely following the production of the variations. The light in translating device 438″ is housed to avoid fogging the film.

Now considering that the film has been exposed and the accompanying sounds recorded and the exposed film processed and a copy is to be made. The negative film F and the positive film F′ after jointly passing the exposure station are separated as shown at F, F′ (Fig. 51) to retract the film F′ along film F so that the picture on the negative at point 438″ appears on the positive at the point 439. There the output from the translating device 438″, by means not shown, is fed to member 441 to activate member 439. Between films F and F′ opposite station 438‴ an opaque reflecting shield S is provided to return to the photosensitive element of device 432″ light modulated by the magnetic record on the negative. The shield S also protects the positive film from the translating light. The shield S is adjustable by means not shown. Means not shown may be provided to separate the films the required distance at F, F′.

For printing the positive, the light source 74 is housed in casing 74′ having aperture 74″ (Fig. 1). The telescopic focusing member 406 removably mounted on door 393 (Figs. 42 and 47) by means not shown is removed to uncover aperture 393′ in the door. The back cover 334 of the exposure aperture is removed and casing 74′ is fitted into aperture 393′ so that aperture 74″ fits up against the back of negative F thereby excluding light from the film chamber. The magazines 91 and 100 and auxiliary chamber 87 are released by members 92 and 92′ and suitable magazines substituted therefor carrying reels, preferably four, for negative and positive film. The shutter is adjusted to operate continuously closed. The switching mechanism for light 74 is adjusted by insertion of proper control disks of the character illustrated in Figs. 30 to 34. In member 73 suitable switches are provided for shifting the light between the various services of copying television images, intermittent lighting projecting and printing. The switching mechanism controlled by the disks times the operation of the light.

With the negative and positive films properly adjusted in the magazines they are run therefrom jointly into the camera, past the exposure station, then are separated sufficiently to retract the positive exposure from its mating negative frame to position the sound recording material at the inscribing station so that information from the negative sound station of a frame when fed back to the inscribing station is inscribed at the mating frame position on the film; then the films are jointly operated past the inscribing station, on past the magnetic sound reproducing station and then on to the respective negative and positive take-up magazines, the thin reflecting member S separating the films opposite point 438″ and blocking the translating light from the film F′. In some cases the separation of the films at points F—F′ cannot be accommodated completely in the case 7 in which event a section 7′ in the base of the case is manually removed providing access through passages 8′ and 4′ in members 5 and 2 respectively to auxiliary chamber 4″ which chamber is removably attached by means not shown to member 2. The passages 8′ and 4′ are prevented from admitting light to film chamber 77 by means not shown when the latter is shifted laterally for focusing the camera and the latter in making exposures.

It is apparent that the requirement for the magnetizeable material to be present and uniformly magnetized at the time of making the inscribing action is to provide magnetic monitoring means for the recording operation. Otherwise the magnetic material may be placed later in which event the transparent material to be scribed may carry a surface only that is electroconductive, the scribing action removing the conductive material variably. The remnant conductive material may then be coated electrolytically as a step in the placement of the magnetizable material, the latter then being magnetized uniformly. Other treatment than that outlined for the subsequent placement of magnetizable material may be employed, the former being by way of example only.

Referring to Figs. 1, 15 and 51, the magnetic recording head 117, the inscribing sound recording member 439 are shown to function at a common point on the circumference of sprocket 85 to locate such recording on the film at a preselected distance from the coincidental image record. Also, light recording means retractably mounted in the wall of chamber 77 is positioned to function at the common point. The recording members are mounted to be selectively positioned for operation at the common point, such mounting accommodating selective displacement from the common point, but it is to be understood that their point of mounting is not limited to this location. For example, they may be positioned to function along the tail portion of parts 438—438′, and along the film thereafter towards the take-up magazine.

Details of a suitable photographic sound recorder are set forth in U.S. Patent 1,984,430. With this recorder positioned to function at the common point, signals may be fed to it from translating device 438′—438″ as part of the printing operation. It is obvious that the head 118 and support 121 may be shaped and dimensioned for support from support 124′ and may be backed by shoe 438 in place of sprocket 85.

It is thus seen that the invention lends itself to various modes of sound recording in connection with printing a film. Again, where it is desired to utilize photographic sound recording from the inner side of transparent member 407 (Fig. 48), the light 434 may be fitted through a second aperture not shown in door 393 with a shield member such as 74′ fitting therein and with an aperture such as 74″ fitted to the interior of the ring 407 and suitably sized. In this manner the illumination is confined so that only that part passing through the aperture reaches the negative and the unexposed sound track area of the positive films. The positive and negative films may be jointly wound on supply reel and then jointly wound on a take-up reel in the absence of the preferred arrangement of separate supply and take-up reels for each film. Suitable leaders on the films are provided for threading through the casing in the presence of illumination that would be detrimental.

While illustration for the intermittent exposures and the running exposures (Fig. 51) show the latter leading on the film, it is contemplated that the scope of this invention shall include relative disposition of the exposing agencies and scribing agencies such that the intermittent exposures lead the running exposures, in which case when the photosensitive film F″ is being printed from negative F‴, films occupy the relative positions F″—F‴ as shown. Also, the member 438 will be placed adjacent roll 110, and 438′ across the film from roll 111, member 441 will be placed with scriber 439 adjacent roll 109, reflecting spacer S will be placed between films F″ and F‴ to reflect light from member 438″ back through aperture 438‴. The operating details are obvious without further explanation. Also the magnetic erasing, recording and reproducing heads may be placed in operative positions in the order mentioned with the erasing head adjacent roll 109 and reproducing head adjacent roll 111.

The various mechanical arrangements presented and their description are by way of illustration only and it will be understood that other mechanical arrangements and devices may be employed to effect the modes of operation and the results described. Other arrangements, modifications and variations will occur to those skilled in the art to which the invention is related. Accordingly, my invention should be understood as not restricted to the specific embodiments illustrated and described but as including all embodiments coming within the scope of the following claims.

I claim:

1. In a motion picture camera, means for moving film intermittently past an exposure station, means located at the approach side and departing side of the exposure area of the film for movably supporting the film between exposures and for holding same during exposures, an adjustable shutter in front of said area, driving means for said operating members, a tubular member extending from the side of the camera across the rear of said film with an opening to the latter and an end opening out of the camera, said tubular member being a light guard to shut illumination therein from the film handling chamber and to direct illumination therein to said film area; with means including make and break means having an operating connection to said driving means and a movable lamp outside of said camera turned on and off by said make and break means for supplying illumination in synchronism with the stationary intervals of said film moving mechanism, and selectively to the field of said camera for taking pictures and to the rear of said film area when printing onto a photo sensitive film adjacent the shutter from a negative film adjacent said guard; in the latter case said negative and said sensitive film being in contact and operated by said moving means jointly; and a removable cover over said end opening of said guard permitting placement of said lamp for illuminating said guard interially when such action is selected, in which event said shutter is closed to limit illumination of the film to that coming from said guard, said cover limiting illumination of the film to that entering through said shutter.

2. In motion picture apparatus for recording and copying motion pictures on film, a motion picture camera having an intermittent film pull-down mechanism, an adjustable rotary shutter and driving means, an apertured frame behind the picture exposing area of the film backing the latter in the film handling chamber; a side closure to said film handling chamber; an aperture in said closure giving access to said apertured frame, a tubular light guard fitting within said film handling chamber between said apertured frame and said side closure aperture; means including make and break means having a releasable operating connection to said driving means for intermittently supplying illumination interially of said guard and therefrom to the back of said exposing area in synchronism with the stationary interval of said pull mechanism, said guard excluding said illumination from uncovered film in said handling chamber; during the exposure of the film to the field of view of said camera said shutter being opened to a selected degree while said operating connection for said make and break means is adjusted to prevent illumination to the back of the single film threaded in place; during said exposure said shutter being adjusted to prevent entrance of light from the front and said make and break operating connection being adjusted to provide illumination from the rear through the negative film positioned adjacent said apertured frame to the accompanying photo sensitive film, said films being shifted as one past said frame by said intermittent mechanism.

3. In combination with a motion picture camera for recording and copying pictures and accompanying sound on photo sensitive film carrying a non-sensitive layer and a thin protective layer for receiving a sound vibration record optically reproducible, said camera having supply and take up reels, an intermittent film pull-down mechanism, an adjustable rotary shutter, a sprocket for feeding film continuously to and from said intermittent mechanism and driving means for said pull mechanism, sprocket and take up reel; the sound record copying station including said sprocket, scribing means mounted to bear yieldingly against said thin protective layer and non-sensitive layer of a copying film backed on said sprocket by a negative film carrying a sound record to be copied, said copying film and negative film moving jointly as one with said sprocket; means carrying electric current modulated to the frequency of sound to actuate said scribe; beyond said scribe in the path of said films and separating same, a reflector abutting said negative sound record; opposite said reflector and abutting the film carrier for said record shielded means supplying illumination and utilizing same when returned in modulated state to modulate electric current to the frequencies of the recorded sound, said modulated current being supplied to said means for actuating said scribe; the length of negative film extending from the pull-down mechanism to said reflector approximating the length of copying film extending from the pull-down mechanism to said scribe, so that the position of the sound record on the copy relative to the picture record on same will duplicate such relative positions occurring on the negative, when said pictures and sound records are copied simultaneously; means adjacent the negative film and opposite said shutter for printing the copy picture.

4. In a motion picture camera a station for copying a sound record from a negative carrying a vibration sound record optically reproducible supplied jointly with copy film from a supply reel fed jointly into and out of said camera by a sprocket and to driven take up means, said station including said sprocket carrying said copy film jointly with said negative film, the latter nearer the sprocket, scribing means mounted to bear yieldingly against a thin protective layer covering a non-sensitive layer on the copy film on said sprocket; means carrying electric current modulated to the frequency of sound to actuate said scribe; means in the path of said films departing from said sprocket separating same with a reflecting surface abutting said sound record; abutting said negative film opposite to said reflecting surface and shielded means supplying illumination and utilizing same when reflected back in modulated state to modulate electric current to the frequencies of the recorded sound and a connection supplying said current to said means for actuating said scribe.

5. In a motion picture camera a station for copying a picture record and a station for copying a sound record simultaneously from a negative carrying the picture record separated from the sound record longitudinally and laterally, said sound record being a vibration record optically reproducible, said camera having an intermittent film pull-down mechanism, an adjustable rotary shutter and driving means, an apertured frame and a removable cover therefor behind the picture exposing area of the film and contiguous to the latter in the film handling chamber, normally said cover being in said position but being removed to permit illumination for printing; said copying station including a tubular light guard within the film handling chamber fitting said apertured frame and extending to an aperture in the side of the camera; means including make and break means having a releasable operating connection to said driving means for intermittently supplying illumination interially of said guard and therefrom to the back of said exposing area in synchronism with the stationary interval of said pull mechanism, said guard excluding said illumination from uncovered film in said handling chamber; during the exposure of the film to the field of view of said camera said shutter being opened to a selected degree while said operating connection for said make and break means is adjusted to prevent illumination to the back of the single film threaded in place; during copying exposure said shutter being adjusted to prevent entrance of light from the front and said make and break operating connection being adjusted to provide illumination from the rear through the negative film positioned adjacent said apertured frame to the accompanying photo sensitive film, said films being shifted as one past said frame by said intermittent mechanism, said sound recording station including a sprocket feeding film continuously to and from said intermittent mechanism out from and to supply and take up reels respectively, the latter having a connection to said driving means; scribing means mounted to move variably against said sound copy material carried with said negative on said sprocket; means carrying electric current modulated to the frequency of sound to actuate said scribe, means in the path of said films departing jointly from said sprocket separating same and presenting a reflecting surface abutting said sound record; shielded means abutting said negative film opposite said reflector supplying illumination and utilizing same when reflected back by said reflector in modulated state to modulate electric current to the frequencies of the recorded sound thereby providing said modulated current to said before mentioned means for actuating said scribe.

References Cited in the file of this patent

UNITED STATES PATENTS

| | | |
|---|---|---|
| 1,466,774 | Wassilieff | Sept. 4, 1923 |
| 1,764,938 | De Forest | June 17, 1930 |
| 1,860,949 | Pittman | May 31, 1932 |
| 2,539,228 | Celestin | Jan. 23, 1951 |
| 2,586,772 | Ashby et al. | Feb. 26, 1952 |